US009953646B2

(12) United States Patent
Sadkin et al.

(10) Patent No.: US 9,953,646 B2
(45) Date of Patent: Apr. 24, 2018

(54) METHOD AND SYSTEM FOR DYNAMIC SPEECH RECOGNITION AND TRACKING OF PREWRITTEN SCRIPT

(71) Applicant: Belleau Technologies, New York, NY (US)

(72) Inventors: Eric Sadkin, New York, NY (US); Lakshmish Kaushik, Irving, TX (US); Jasjeet Gill, New York, NY (US); Etay Luz, Miami Beach, FL (US)

( * ) Notice: Subject to any disclaimer, the term of this patent is extended or adjusted under 35 U.S.C. 154(b) by 205 days.

(21) Appl. No.: 14/843,923

(22) Filed: Sep. 2, 2015

(65) Prior Publication Data

US 2016/0062970 A1     Mar. 3, 2016

Related U.S. Application Data

(60) Provisional application No. 62/044,506, filed on Sep. 2, 2014.

(51) Int. Cl.
| | |
|---|---|
| *G06F 17/00* | (2006.01) |
| *G10L 15/22* | (2006.01) |
| *G06F 17/21* | (2006.01) |
| *G06F 17/27* | (2006.01) |
| *G06F 3/023* | (2006.01) |
| *G10L 15/197* | (2013.01) |

(52) U.S. Cl.
CPC ............ *G10L 15/22* (2013.01); *G06F 17/211* (2013.01); *G06F 17/212* (2013.01); *G06F 17/2785* (2013.01); *G06F 3/0237* (2013.01); *G10L 15/197* (2013.01); *G10L 2015/225* (2013.01)

(58) Field of Classification Search
CPC .................................................... G06F 3/0237
See application file for complete search history.

(56) References Cited

U.S. PATENT DOCUMENTS

| | | |
|---|---|---|
| 4,718,094 A | 1/1988 | Bahl et al. |
| 4,827,521 A | 5/1989 | Bahl et al. |
| 5,195,167 A | 3/1993 | Bahl et al. |

(Continued)

OTHER PUBLICATIONS

Abdulhamid, et al., "Treemaps to Visualise and Navigate Speech Audio" OZCHI '13, Nov. 25-29 2013, Adelaide, Australia Copyright 2013 ACM, p. 555-564.*

(Continued)

*Primary Examiner* — Amelia Tapp
(74) *Attorney, Agent, or Firm* — Kevin Keener; Keener and Associates P.C.

(57) ABSTRACT

A computer-implemented method for dynamically presenting a prewritten text in a graphical user interface is disclosed. The method comprises receiving a text artifact, storing the text artifact in a memory device of a computer, retrieving the text artifact, displaying the text artifact on the display screen of the computer, receiving a vocal input, generating a text file representing the words spoken in the vocal input, comparing a predetermined number of the hypothesis words to a predetermined number of the artifact words, determining a match location in the text artifact where a specific number of the predetermined number of hypothesis words match a specific number of the predetermined number of artifact words, and altering the display on the display screen to display the match location on the display screen of the computer.

20 Claims, 10 Drawing Sheets

(56) References Cited

U.S. PATENT DOCUMENTS

| | | |
|---|---|---|
| 5,276,766 A | 1/1994 | Bahl et al. |
| 5,572,570 A | 11/1996 | Kuenzig |
| 5,604,839 A | 2/1997 | Acero et al. |
| 5,627,939 A | 5/1997 | Huang et al. |
| 5,655,945 A | 8/1997 | Jani |
| 5,657,380 A | 8/1997 | Mozer |
| 5,715,369 A | 2/1998 | Spoltman et al. |
| 5,745,873 A | 4/1998 | Braida et al. |
| 5,787,394 A | 7/1998 | Bahl et al. |
| 5,819,222 A | 10/1998 | Smyth et al. |
| 5,829,000 A | 10/1998 | Huang et al. |
| 5,878,390 A | 3/1999 | Kawai et al. |
| 5,884,258 A | 3/1999 | Rozak et al. |
| 5,899,976 A | 5/1999 | Rozak |
| 5,933,804 A | 8/1999 | Huang et al. |
| 5,950,160 A | 9/1999 | Rozak |
| 5,956,671 A | 9/1999 | Ittycheriah et al. |
| 5,963,903 A | 10/1999 | Hon et al. |
| 5,970,449 A | 10/1999 | Alleva et al. |
| 5,983,190 A | 11/1999 | Trower, II et al. |
| 6,044,344 A | 3/2000 | Kanevsky |
| 6,055,498 A | 4/2000 | Neumeyer et al. |
| 6,076,056 A | 6/2000 | Huang et al. |
| 6,141,641 A | 10/2000 | Hwang et al. |
| 6,181,351 B1 | 1/2001 | Merrill et al. |
| 6,185,538 B1 * | 2/2001 | Schulz .................. G11B 27/034 704/235 |
| 6,219,643 B1 | 4/2001 | Cohen et al. |
| 6,226,615 B1 * | 5/2001 | Kirby .................. H04N 5/2222 348/E5.023 |
| 6,246,981 B1 | 6/2001 | Papineni et al. |
| 6,260,011 B1 | 7/2001 | Heckerman et al. |
| 6,262,730 B1 | 7/2001 | Horvitz et al. |
| 6,263,308 B1 | 7/2001 | Heckerman et al. |
| 6,292,857 B1 | 9/2001 | Sidoroff et al. |
| 6,298,324 B1 | 10/2001 | Zuberec et al. |
| 6,301,560 B1 | 10/2001 | Masters |
| 6,308,155 B1 | 10/2001 | Kingsbury et al. |
| 6,324,513 B1 | 11/2001 | Nagai et al. |
| 6,336,108 B1 | 1/2002 | Thiesson et al. |
| 6,356,867 B1 | 3/2002 | Gabai et al. |
| 6,363,347 B1 | 3/2002 | Rozak |
| 6,374,221 B1 | 4/2002 | Haimi-Cohen |
| 6,415,258 B1 | 7/2002 | Reynar et al. |
| 6,418,431 B1 | 7/2002 | Mahajan et al. |
| 6,434,523 B1 | 8/2002 | Monaco |
| 6,434,527 B1 | 8/2002 | Horvitz |
| 6,434,529 B1 | 8/2002 | Walker et al. |
| 6,456,975 B1 | 9/2002 | Chang |
| 6,477,493 B1 | 11/2002 | Brooks et al. |
| 6,490,563 B2 | 12/2002 | Hon et al. |
| 6,496,795 B1 | 12/2002 | Malvar |
| 6,502,066 B2 | 12/2002 | Plumpe |
| 6,502,072 B2 | 12/2002 | Jiang et al. |
| 6,505,159 B1 | 1/2003 | Theodore |
| 6,539,353 B1 | 3/2003 | Jiang et al. |
| 6,542,866 B1 | 4/2003 | Jiang et al. |
| 6,571,210 B2 | 5/2003 | Hon et al. |
| 6,581,033 B1 | 6/2003 | Reynar et al. |
| 6,629,073 B1 | 9/2003 | Hon et al. |
| 6,662,158 B1 | 12/2003 | Hon et al. |
| 6,668,243 B1 | 12/2003 | Odell |
| 6,694,296 B1 | 2/2004 | Alleva et al. |
| 6,697,777 B1 | 2/2004 | Ho et al. |
| 6,782,357 B1 | 8/2004 | Goodman et al. |
| 6,782,362 B1 | 8/2004 | Hon et al. |
| 6,782,364 B2 | 8/2004 | Horvitz |
| 6,856,956 B2 | 2/2005 | Thrasher et al. |
| 6,859,802 B1 | 2/2005 | Rui |
| 6,876,966 B1 | 4/2005 | Deng et al. |
| 6,879,952 B2 | 4/2005 | Acero et al. |
| 6,882,707 B2 | 4/2005 | Engelke et al. |
| 6,904,402 B1 | 6/2005 | Wang et al. |
| 6,917,918 B2 | 6/2005 | Rockenbeck et al. |
| 6,920,425 B1 | 6/2005 | Will et al. |
| 6,928,619 B2 | 8/2005 | Clow et al. |
| 6,934,683 B2 | 8/2005 | Ju et al. |
| 6,957,184 B2 | 10/2005 | Schmid et al. |
| 6,961,694 B2 | 11/2005 | Schmid et al. |
| 6,965,863 B1 | 11/2005 | Zuberec et al. |
| 6,973,427 B2 | 12/2005 | Hwang et al. |
| 6,983,247 B2 | 1/2006 | Ringger et al. |
| 6,983,252 B2 | 1/2006 | Matheson et al. |
| 6,988,072 B2 | 1/2006 | Horvitz |
| 7,016,838 B2 | 3/2006 | Rockenbeck et al. |
| 7,016,847 B1 | 3/2006 | Tessel et al. |
| 7,031,918 B2 | 4/2006 | Hwang |
| 7,047,189 B2 | 5/2006 | Acero et al. |
| 7,050,975 B2 | 5/2006 | Deng et al. |
| 7,058,573 B1 | 6/2006 | Murveit et al. |
| 7,062,436 B1 | 6/2006 | Odell et al. |
| 7,069,216 B2 | 6/2006 | DeMoortel et al. |
| 7,072,838 B1 | 7/2006 | Ghosh et al. |
| 7,076,422 B2 | 7/2006 | Hwang |
| 7,085,710 B1 | 8/2006 | Beckert et al. |
| 7,085,716 B1 | 8/2006 | Even et al. |
| 7,092,884 B2 | 8/2006 | Lewis et al. |
| 7,103,544 B2 | 9/2006 | Mahajan et al. |
| 7,113,950 B2 | 9/2006 | Brill et al. |
| 7,120,477 B2 | 10/2006 | Huang |
| 7,149,970 B1 | 12/2006 | Pratley et al. |
| 7,155,392 B2 | 12/2006 | Schmid et al. |
| 7,162,423 B2 | 1/2007 | Thrasher et al. |
| 7,167,831 B2 | 1/2007 | Falcon et al. |
| 7,174,288 B2 | 2/2007 | Ju et al. |
| 7,174,294 B2 | 2/2007 | Schmid et al. |
| 7,177,807 B1 | 2/2007 | Schmid et al. |
| 7,177,813 B2 | 2/2007 | Schmid et al. |
| 7,181,387 B2 | 2/2007 | Ju et al. |
| 7,197,132 B2 | 3/2007 | Dezonno et al. |
| 7,197,459 B1 | 3/2007 | Harinarayan et al. |
| 7,206,389 B1 | 4/2007 | Dumoulin et al. |
| 7,206,742 B2 | 4/2007 | Schmid et al. |
| 7,219,085 B2 | 5/2007 | Buck et al. |
| 7,240,011 B2 | 7/2007 | Horvitz |
| 7,243,070 B2 | 7/2007 | Hoffmann et al. |
| 7,251,315 B1 | 7/2007 | Quinton |
| 7,251,322 B2 | 7/2007 | Stokes, III et al. |
| 7,251,600 B2 | 7/2007 | Ju et al. |
| 7,263,489 B2 | 8/2007 | Cohen et al. |
| 7,266,495 B1 | 9/2007 | Beaufays et al. |
| 7,272,557 B2 | 9/2007 | Odell |
| 7,274,741 B2 | 9/2007 | Ma et al. |
| 7,275,034 B2 | 9/2007 | Odell et al. |
| 7,283,621 B2 | 10/2007 | Quinton |
| 7,283,850 B2 | 10/2007 | Granovetter et al. |
| 7,289,950 B2 | 10/2007 | Bellegarda et al. |
| 7,289,956 B2 | 10/2007 | Yu et al. |
| 7,292,689 B2 | 11/2007 | Odinak et al. |
| 7,292,975 B2 | 11/2007 | Lovance et al. |
| 7,292,986 B1 | 11/2007 | Venolia et al. |
| 7,299,181 B2 | 11/2007 | Ju et al. |
| 7,315,818 B2 | 1/2008 | Stevens et al. |
| 7,319,960 B2 | 1/2008 | Riis et al. |
| 7,343,290 B2 | 3/2008 | Breuer |
| 7,346,510 B2 | 3/2008 | Deng |
| 7,349,849 B2 | 3/2008 | Silverman et al. |
| 7,349,851 B2 | 3/2008 | Zuberec et al. |
| 7,356,409 B2 | 4/2008 | Quinton |
| 7,363,229 B2 | 4/2008 | Falcon et al. |
| 7,369,997 B2 | 5/2008 | Chambers et al. |
| 7,376,586 B1 | 5/2008 | Partovi et al. |
| 7,379,867 B2 | 5/2008 | Chelba et al. |
| 7,379,874 B2 | 5/2008 | Schmid et al. |
| 7,383,181 B2 | 6/2008 | Huang et al. |
| 7,389,153 B2 | 6/2008 | Giaimo, III et al. |
| 7,389,234 B2 | 6/2008 | Schmid et al. |
| 7,389,475 B2 | 6/2008 | Clow et al. |
| 7,391,860 B2 | 6/2008 | Odinak et al. |
| 7,409,349 B2 | 8/2008 | Wang et al. |
| 7,418,383 B2 | 8/2008 | Droppo et al. |
| 7,421,386 B2 | 9/2008 | Powell et al. |
| 7,428,491 B2 | 9/2008 | Wang et al. |
| 7,437,290 B2 | 10/2008 | Danieli |

(56) References Cited

U.S. PATENT DOCUMENTS

| | | | |
|---|---|---|---|
| 7,451,083 | B2 | 11/2008 | Frey et al. |
| 7,451,389 | B2 | 11/2008 | Huynh et al. |
| 7,454,336 | B2 | 11/2008 | Attias et al. |
| 7,454,344 | B2 | 11/2008 | Ramsey |
| 7,460,992 | B2 | 12/2008 | Droppo et al. |
| 7,461,059 | B2 | 12/2008 | Richardson et al. |
| 7,475,017 | B2 | 1/2009 | Ju et al. |
| 7,487,087 | B2 | 2/2009 | Attias et al. |
| 7,496,513 | B2 | 2/2009 | Soong et al. |
| 7,496,693 | B2 | 2/2009 | Cook et al. |
| 7,499,857 | B2 | 3/2009 | Gunawardana |
| 7,506,022 | B2 | 3/2009 | Wang et al. |
| 7,506,271 | B2 | 3/2009 | Wang et al. |
| 7,516,067 | B2 | 4/2009 | Seltzer et al. |
| 7,518,631 | B2 | 4/2009 | Hershey et al. |
| 7,519,531 | B2 | 4/2009 | Acero et al. |
| 7,519,536 | B2 | 4/2009 | Maes et al. |
| 7,533,020 | B2 | 5/2009 | Arnold et al. |
| 7,548,856 | B2 | 6/2009 | Thiesson et al. |
| 7,551,944 | B2 | 6/2009 | Bareis et al. |
| 7,552,221 | B2 | 6/2009 | Hennecke |
| 7,561,673 | B2 | 7/2009 | Wang |
| 7,565,284 | B2 | 7/2009 | Deng et al. |
| 7,567,902 | B2 | 7/2009 | Davis et al. |
| 7,571,096 | B2 | 8/2009 | Schmid et al. |
| 7,571,100 | B2 | 8/2009 | Lenir et al. |
| 7,574,359 | B2 | 8/2009 | Huang |
| 7,580,570 | B2 | 8/2009 | Manu et al. |
| 7,587,317 | B2 | 9/2009 | Falcon et al. |
| 7,590,533 | B2 | 9/2009 | Hwang |
| 7,593,843 | B2 | 9/2009 | Aue et al. |
| 7,610,204 | B2 | 10/2009 | Ruback et al. |
| 7,610,547 | B2 | 10/2009 | Wang et al. |
| 7,613,532 | B2 | 11/2009 | Anderson et al. |
| 7,617,103 | B2 | 11/2009 | He et al. |
| 7,617,104 | B2 | 11/2009 | Deng et al. |
| 7,624,014 | B2 | 11/2009 | Stewart et al. |
| 7,624,016 | B2 | 11/2009 | Ju et al. |
| 7,624,018 | B2 | 11/2009 | Chambers et al. |
| 7,624,019 | B2 | 11/2009 | Andrew |
| 7,627,638 | B1 | 12/2009 | Cohen |
| 7,634,066 | B2 | 12/2009 | Quinton |
| 7,634,404 | B2 | 12/2009 | Hon et al. |
| 7,634,405 | B2 | 12/2009 | Basu et al. |
| 7,634,406 | B2 | 12/2009 | Li et al. |
| 7,634,407 | B2 | 12/2009 | Chelba et al. |
| 7,636,657 | B2 | 12/2009 | Ju et al. |
| 7,636,661 | B2 | 12/2009 | De Leeuw et al. |
| 7,640,159 | B2 | 12/2009 | Reich |
| 7,640,161 | B2 | 12/2009 | Morris et al. |
| 7,640,272 | B2 | 12/2009 | Mahajan et al. |
| 7,643,985 | B2 | 1/2010 | Horvitz |
| 7,643,995 | B2 | 1/2010 | Acero et al. |
| 7,653,547 | B2 | 1/2010 | Kershaw et al. |
| 7,657,432 | B2 | 2/2010 | Chaudhari et al. |
| 7,657,845 | B2 | 2/2010 | Drucker et al. |
| 7,660,717 | B2 | 2/2010 | Takiguchi et al. |
| 7,664,637 | B2 | 2/2010 | Deligne et al. |
| 7,664,638 | B2 | 2/2010 | Cooper et al. |
| 7,665,041 | B2 | 2/2010 | Wilson et al. |
| 7,668,721 | B2 | 2/2010 | Barkley et al. |
| 7,668,867 | B2 | 2/2010 | Morris et al. |
| 7,672,832 | B2 | 3/2010 | Huang et al. |
| 7,672,847 | B2 | 3/2010 | He et al. |
| 7,676,365 | B2 | 3/2010 | Hwang et al. |
| 7,676,371 | B2 | 3/2010 | Cross, Jr. et al. |
| 7,676,373 | B2 | 3/2010 | Miyamoto et al. |
| 7,680,514 | B2 | 3/2010 | Cook et al. |
| 7,680,661 | B2 | 3/2010 | Co et al. |
| 7,681,123 | B2 * | 3/2010 | Krause .................. G06F 3/012 715/255 |
| 7,684,987 | B2 | 3/2010 | Chu et al. |
| 7,684,988 | B2 | 3/2010 | Barquilla |
| 7,689,413 | B2 | 3/2010 | Hershey et al. |
| 7,689,419 | B2 | 3/2010 | Mahajan et al. |
| 7,689,420 | B2 | 3/2010 | Paek et al. |
| 7,689,426 | B2 | 3/2010 | Matula |
| 7,702,503 | B2 | 4/2010 | Monkowski |
| 7,702,512 | B2 | 4/2010 | Gopinath et al. |
| 7,711,551 | B2 | 5/2010 | Lopez-Barquilla et al. |
| 7,716,057 | B2 | 5/2010 | Horvitz |
| 7,720,678 | B2 | 5/2010 | Falcon et al. |
| 7,720,679 | B2 | 5/2010 | Ichikawa et al. |
| 7,721,301 | B2 | 5/2010 | Wong et al. |
| 7,729,917 | B2 | 6/2010 | Miyamoto et al. |
| 7,729,919 | B2 | 6/2010 | Wang |
| 7,739,221 | B2 | 6/2010 | Lawler et al. |
| 7,747,437 | B2 | 6/2010 | Verhasselt et al. |
| 7,747,440 | B2 | 6/2010 | Eide et al. |
| 7,751,535 | B2 | 7/2010 | Creamer et al. |
| 7,752,043 | B2 | 7/2010 | Watson |
| 7,752,152 | B2 | 7/2010 | Paek et al. |
| 7,756,708 | B2 | 7/2010 | Cohen et al. |
| 7,756,802 | B2 | 7/2010 | Zhang |
| 7,778,816 | B2 | 8/2010 | Reynar |
| 7,778,821 | B2 | 8/2010 | Mowatt et al. |
| 7,778,830 | B2 | 8/2010 | Davis et al. |
| 7,783,305 | B2 | 8/2010 | Ross et al. |
| 7,783,484 | B2 | 8/2010 | Deligne et al. |
| 7,783,488 | B2 | 8/2010 | Ben-David et al. |
| 7,788,103 | B2 | 8/2010 | Marcus |
| 7,788,594 | B1 | 8/2010 | Tevanian, Jr. |
| 7,801,727 | B2 | 9/2010 | Gopalakrishnan et al. |
| 7,801,756 | B1 | 9/2010 | Harinarayan et al. |
| 7,801,968 | B2 | 9/2010 | Wang et al. |
| 7,805,305 | B2 | 9/2010 | Badt et al. |
| 7,805,308 | B2 | 9/2010 | Deng et al. |
| 7,809,566 | B2 | 10/2010 | Meermeier |
| 7,809,567 | B2 | 10/2010 | Ju et al. |
| 7,813,920 | B2 | 10/2010 | Leung et al. |
| 7,813,926 | B2 | 10/2010 | Wang et al. |
| 7,813,929 | B2 | 10/2010 | Bisani et al. |
| 7,814,501 | B2 | 10/2010 | Lecoeuche et al. |
| 7,822,608 | B2 | 10/2010 | Cross, Jr. et al. |
| 7,827,033 | B2 | 11/2010 | Ativanichayaphong et al. |
| 7,827,232 | B2 | 11/2010 | Bear et al. |
| 7,831,425 | B2 | 11/2010 | Acero et al. |
| 7,831,427 | B2 | 11/2010 | Potter et al. |
| 7,840,407 | B2 | 11/2010 | Strope et al. |
| 7,840,409 | B2 | 11/2010 | Ativanichayaphong et al. |
| 7,844,456 | B2 | 11/2010 | Cai et al. |
| 7,844,465 | B2 | 11/2010 | Marcus |
| 7,848,314 | B2 | 12/2010 | Cross, Jr. et al. |
| 7,852,993 | B2 | 12/2010 | Ju et al. |
| 7,856,351 | B2 | 12/2010 | Yaman et al. |
| 7,860,707 | B2 | 12/2010 | Yu et al. |
| 7,860,715 | B2 | 12/2010 | Essenmacher et al. |
| 7,864,929 | B2 | 1/2011 | Carro |
| 7,865,357 | B2 | 1/2011 | Acero et al. |
| 7,865,364 | B2 | 1/2011 | Helbing |
| 7,870,000 | B2 | 1/2011 | Ativanichayaphong et al. |
| 7,873,209 | B2 | 1/2011 | Deng et al. |
| 7,881,930 | B2 | 2/2011 | Faisman et al. |
| 7,881,932 | B2 | 2/2011 | Muschett |
| 7,881,938 | B2 | 2/2011 | Muschett et al. |
| 7,885,811 | B2 | 2/2011 | Zimmerman et al. |
| 7,885,812 | B2 | 2/2011 | Acero et al. |
| 7,885,817 | B2 | 2/2011 | Paek et al. |
| 7,890,325 | B2 | 2/2011 | Liu et al. |
| 7,890,326 | B2 | 2/2011 | Strope et al. |
| 7,899,673 | B2 | 3/2011 | Brown |
| 7,904,296 | B2 | 3/2011 | Morris |
| 7,904,299 | B2 | 3/2011 | Gandhi et al. |
| 7,908,151 | B2 | 3/2011 | Heckerman et al. |
| 7,912,186 | B2 | 3/2011 | Howell et al. |
| 7,912,700 | B2 | 3/2011 | Bower et al. |
| 7,917,514 | B2 | 3/2011 | Lawler et al. |
| 7,925,502 | B2 | 4/2011 | Droppo et al. |
| 7,925,505 | B2 | 4/2011 | Wu |
| 7,925,512 | B2 | 4/2011 | Cross, Jr. et al. |
| 7,941,316 | B2 | 5/2011 | Mahajan et al. |
| 7,953,597 | B2 | 5/2011 | Ativanichayaphong et al. |
| 7,957,959 | B2 | 6/2011 | Han et al. |
| 7,957,969 | B2 | 6/2011 | Alewine et al. |

(56) References Cited

U.S. PATENT DOCUMENTS

| | | |
|---|---|---|
| 7,962,337 B2 | 6/2011 | Steinbiss |
| 7,962,340 B2 | 6/2011 | Comerford et al. |
| 7,962,344 B2 | 6/2011 | Sharpe et al. |
| 7,966,180 B2 | 6/2011 | Bajaj et al. |
| 7,970,608 B2 | 6/2011 | Madhavapeddi et al. |
| 7,974,476 B2 | 7/2011 | Zhang et al. |
| 7,974,842 B2 | 7/2011 | Helbing et al. |
| 7,983,913 B2 | 7/2011 | Seltzer et al. |
| 7,983,914 B2 | 7/2011 | Eckhart et al. |
| 7,984,035 B2 | 7/2011 | Levin et al. |
| 7,991,607 B2 | 8/2011 | Zhang et al. |
| 7,991,613 B2 | 8/2011 | Blair |
| 7,991,615 B2 | 8/2011 | Li et al. |
| 7,996,225 B2 | 8/2011 | Schmid et al. |
| 8,000,962 B2 | 8/2011 | Doyle et al. |
| 8,000,966 B2 | 8/2011 | Mori et al. |
| 8,005,683 B2 | 8/2011 | Tessel et al. |
| 8,009,819 B2 | 8/2011 | Faizakov et al. |
| 8,010,367 B2 | 8/2011 | Muschett et al. |
| 8,019,387 B2 | 9/2011 | Bareis et al. |
| 8,019,591 B2 | 9/2011 | Gao et al. |
| 8,019,602 B2 | 9/2011 | Yu et al. |
| 8,019,607 B2 | 9/2011 | Creamer et al. |
| 8,024,184 B2 | 9/2011 | Takiguchi et al. |
| 8,024,194 B2 | 9/2011 | Cross, Jr. et al. |
| 8,024,422 B2 | 9/2011 | Kroeker et al. |
| 8,032,375 B2 | 10/2011 | Chickering et al. |
| 8,036,889 B2 | 10/2011 | Carus et al. |
| 8,036,893 B2 | 10/2011 | Reich |
| 8,036,896 B2 | 10/2011 | Adams, Jr. et al. |
| 8,041,561 B2 | 10/2011 | Deligne et al. |
| 8,041,568 B2 | 10/2011 | Strope et al. |
| 8,041,570 B2 | 10/2011 | Mirkovic et al. |
| 8,046,220 B2 | 10/2011 | Agarwal et al. |
| 8,046,224 B2 | 10/2011 | Rajput et al. |
| 8,060,360 B2 | 11/2011 | He |
| 8,060,365 B2 | 11/2011 | Itoh et al. |
| 8,065,142 B2 | 11/2011 | Imoto et al. |
| 8,065,143 B2 | 11/2011 | Yanagihara |
| 8,065,146 B2 | 11/2011 | Acero et al. |
| 8,065,149 B2 | 11/2011 | Kurata et al. |
| 8,069,032 B2 | 11/2011 | Odell et al. |
| 8,069,045 B2 | 11/2011 | Emam et al. |
| 8,073,692 B2 | 12/2011 | Ativanichayaphong et al. |
| 8,073,697 B2 | 12/2011 | Cross, Jr. et al. |
| 8,074,199 B2 | 12/2011 | Millett et al. |
| 8,079,079 B2 | 12/2011 | Zhang et al. |
| 8,082,148 B2 | 12/2011 | Agapi et al. |
| 8,086,455 B2 | 12/2011 | Gong et al. |
| 8,086,460 B2 | 12/2011 | Da Palma et al. |
| 8,086,463 B2 | 12/2011 | Ativanichayaphong et al. |
| 8,090,077 B2 | 1/2012 | Wang et al. |
| 8,090,738 B2 | 1/2012 | Paeck et al. |
| 8,095,371 B2 | 1/2012 | Horioka et al. |
| 8,099,279 B2 | 1/2012 | Acero et al. |
| 8,099,287 B2 | 1/2012 | Bodin et al. |
| 8,103,503 B2 | 1/2012 | Duncan |
| 8,103,646 B2 | 1/2012 | Brown |
| 8,108,205 B2 | 1/2012 | Paek et al. |
| 8,111,282 B2 | 2/2012 | Cutler et al. |
| 8,112,274 B2 | 2/2012 | Beyerlein |
| 8,117,032 B2 | 2/2012 | Charoenruengkit et al. |
| 8,121,837 B2 | 2/2012 | Agapi et al. |
| 8,121,838 B2 | 2/2012 | Kobal et al. |
| 8,121,840 B2 | 2/2012 | Chu et al. |
| 8,126,715 B2 | 2/2012 | Paek |
| 8,131,545 B1 | 3/2012 | Moreno et al. |
| 8,131,548 B2 | 3/2012 | Blass |
| 8,131,750 B2 | 3/2012 | Bathiche et al. |
| 8,135,578 B2 | 3/2012 | Hebert |
| 8,135,589 B1 | 3/2012 | Reding et al. |
| 8,145,484 B2 | 3/2012 | Zweig |
| 8,145,488 B2 | 3/2012 | Yu et al. |
| 8,145,494 B2 | 3/2012 | Horioka et al. |
| 8,150,687 B2 | 4/2012 | Mori et al. |
| 8,150,692 B2 | 4/2012 | Stewart et al. |
| 8,150,693 B2 | 4/2012 | Mori et al. |
| 8,160,876 B2 | 4/2012 | Dow et al. |
| 8,160,878 B2 | 4/2012 | Yu et al. |
| 8,165,876 B2 | 4/2012 | Emam et al. |
| 8,165,877 B2 | 4/2012 | Wang et al. |
| 8,165,883 B2 | 4/2012 | Galanes et al. |
| 8,170,537 B1 | 5/2012 | Bort |
| 8,175,872 B2 | 5/2012 | Kristjansson et al. |
| 8,179,419 B2 | 5/2012 | Girish et al. |
| 8,180,069 B2 | 5/2012 | Buck et al. |
| 8,180,636 B2 | 5/2012 | Droppo et al. |
| 8,180,640 B2 | 5/2012 | Li et al. |
| 8,180,641 B2 | 5/2012 | Levit et al. |
| 8,185,392 B1 | 5/2012 | Strope et al. |
| 8,190,430 B2 | 5/2012 | Doyle et al. |
| 8,190,437 B2 | 5/2012 | Farrell et al. |
| 8,190,479 B2 | 5/2012 | Surendran et al. |
| 8,204,746 B2 | 6/2012 | Odinak |
| 8,209,169 B2 | 6/2012 | Imoto et al. |
| 8,209,175 B2 | 6/2012 | Mukerjee et al. |
| 8,214,215 B2 | 7/2012 | Li et al. |
| 8,219,384 B2 | 7/2012 | Lloyd et al. |
| 8,219,406 B2 | 7/2012 | Yu et al. |
| 8,223,932 B2 | 7/2012 | Forbes et al. |
| 8,224,644 B2 | 7/2012 | Krumel et al. |
| 8,224,650 B2 | 7/2012 | Galanes et al. |
| 8,224,656 B2 | 7/2012 | Scholz et al. |
| 8,229,744 B2 | 7/2012 | Dharanipragada et al. |
| 8,229,750 B2 | 7/2012 | Creamer et al. |
| 8,229,753 B2 | 7/2012 | Galanes et al. |
| 8,233,592 B2 | 7/2012 | Gandhi et al. |
| 8,234,111 B2 | 7/2012 | Lloyd et al. |
| 8,234,120 B2 | 7/2012 | Agapi et al. |
| 8,239,195 B2 | 8/2012 | Li et al. |
| 8,239,203 B2 | 8/2012 | Stubley et al. |
| 8,239,206 B1 | 8/2012 | LeBeau et al. |
| 8,239,332 B2 | 8/2012 | Liu et al. |
| 8,239,366 B2 | 8/2012 | Sejnoha et al. |
| 8,244,545 B2 | 8/2012 | Paek et al. |
| 8,249,868 B2 | 8/2012 | Lloyd et al. |
| 8,249,871 B2 | 8/2012 | Mukerjee |
| 8,254,535 B1 | 8/2012 | Madhavapeddi et al. |
| 8,255,216 B2 | 8/2012 | White |
| 8,255,218 B1 | 8/2012 | Cohen et al. |
| 8,255,223 B2 | 8/2012 | Wang |
| 8,255,293 B1 | 8/2012 | Davies |
| 8,260,615 B1 | 9/2012 | Nakajima et al. |
| 8,265,928 B2 | 9/2012 | Kristjansson et al. |
| 8,266,078 B2 | 9/2012 | Zou et al. |
| 8,271,268 B2 | 9/2012 | Keohane et al. |
| 8,275,618 B2 | 9/2012 | Ganong, III |
| 8,275,619 B2 | 9/2012 | Herbig et al. |
| 8,275,621 B2 | 9/2012 | Alewine et al. |
| 8,280,733 B2 | 10/2012 | Yu et al. |
| 8,285,546 B2 | 10/2012 | Reich |
| 8,290,772 B1 | 10/2012 | Cohen et al. |
| 8,290,775 B2 | 10/2012 | Etezadi et al. |
| 8,296,142 B2 | 10/2012 | Lloyd et al. |
| 8,296,383 B2 | 10/2012 | Lindahl |
| 8,301,445 B2 | 10/2012 | Gruhn et al. |
| 8,301,448 B2 | 10/2012 | Carus et al. |
| 8,301,449 B2 | 10/2012 | He et al. |
| 8,306,511 B2 | 11/2012 | Ling et al. |
| 8,306,815 B2 | 11/2012 | Konig et al. |
| 8,306,817 B2 | 11/2012 | Yu et al. |
| 8,306,819 B2 | 11/2012 | Liu et al. |
| 8,306,822 B2 | 11/2012 | Li et al. |
| 8,311,822 B2 | 11/2012 | Bahl et al. |
| 8,311,828 B2 | 11/2012 | Arrowood et al. |
| 8,311,835 B2 | 11/2012 | Lecoeuche |
| 8,315,874 B2 | 11/2012 | Barton et al. |
| 8,315,878 B1 | 11/2012 | Burns et al. |
| 8,321,277 B2 | 11/2012 | Coulomb et al. |
| 8,332,218 B2 | 12/2012 | Cross, Jr. et al. |
| 8,332,225 B2 | 12/2012 | Zhao et al. |
| 8,332,227 B2 | 12/2012 | Maes et al. |
| 8,335,683 B2 | 12/2012 | Acero et al. |
| 8,335,687 B1 | 12/2012 | Reding et al. |

(56) References Cited

U.S. PATENT DOCUMENTS

| | | |
|---|---|---|
| 8,346,551 B2 | 1/2013 | Herbig et al. |
| 8,346,554 B2 | 1/2013 | Zlokarnik |
| 8,346,555 B2 | 1/2013 | Metz |
| 8,352,245 B1 | 1/2013 | Lloyd |
| 8,352,246 B1 | 1/2013 | Lloyd |
| 8,352,276 B1 | 1/2013 | Pettay et al. |
| 8,355,484 B2 | 1/2013 | Eide et al. |
| 8,355,918 B2 | 1/2013 | Agapi et al. |
| 8,355,920 B2 | 1/2013 | Gopinath et al. |
| 8,359,201 B1 | 1/2013 | Talbot et al. |
| 8,364,481 B2 | 1/2013 | Stroke et al. |
| 8,370,143 B1 | 2/2013 | Coker |
| 8,370,146 B1 | 2/2013 | Schalkwyk et al. |
| 8,374,865 B1 | 2/2013 | Biadsy et al. |
| 8,380,505 B2 | 2/2013 | Konig et al. |
| 8,380,514 B2 | 2/2013 | Bodin et al. |
| 8,386,248 B2 | 2/2013 | Dhanakshirur et al. |
| 8,386,250 B2 | 2/2013 | Lloyd et al. |
| 8,386,251 B2 | 2/2013 | Strom et al. |
| 8,386,254 B2 | 2/2013 | Deshmukh et al. |
| 8,391,464 B1 | 3/2013 | Sharp |
| 8,396,709 B2 | 3/2013 | Lloyd et al. |
| 8,396,973 B2 | 3/2013 | Wang |
| 8,401,846 B1 | 3/2013 | Reding et al. |
| 8,401,852 B2 | 3/2013 | Zweig et al. |
| 8,401,854 B2 | 3/2013 | Schwarz |
| 8,406,384 B1 | 3/2013 | Tremblay et al. |
| 8,407,041 B2 | 3/2013 | Deng et al. |
| 8,407,050 B2 | 3/2013 | Kobal et al. |
| 8,407,057 B2 | 3/2013 | Comerford et al. |
| 8,412,526 B2 | 4/2013 | Sorin |
| 8,412,531 B2 | 4/2013 | Sullivan et al. |
| 8,417,527 B2 | 4/2013 | Rajput et al. |
| 8,417,530 B1 | 4/2013 | Hayes |
| 8,423,359 B2 | 4/2013 | Cohen et al. |
| 8,423,364 B2 | 4/2013 | Yu et al. |
| 8,428,241 B2 | 4/2013 | Faizakov et al. |
| 8,428,940 B2 | 4/2013 | Kristjansson et al. |
| 8,428,944 B2 | 4/2013 | Poultney et al. |
| 8,433,611 B2 | 4/2013 | Lax et al. |
| 8,438,025 B2 | 5/2013 | Bahl et al. |
| 8,438,026 B2 | 5/2013 | Fischer et al. |
| 8,442,824 B2 | 5/2013 | Aley-Raz et al. |
| 8,442,826 B2 | 5/2013 | Hamaker et al. |
| 8,442,830 B2 | 5/2013 | Nakajima et al. |
| 8,447,599 B2 | 5/2013 | Reding et al. |
| 8,447,600 B2 | 5/2013 | Cohen et al. |
| 8,447,616 B2 | 5/2013 | Falcon et al. |
| 8,451,823 B2 | 5/2013 | Ben-David et al. |
| 8,452,597 B2 | 5/2013 | Bringert et al. |
| 8,452,602 B1 | 5/2013 | Bringert et al. |
| 8,457,946 B2 | 6/2013 | Kuo et al. |
| 8,457,967 B2 | 6/2013 | Audhkhasi et al. |
| 8,463,606 B2 | 6/2013 | Scott et al. |
| 8,463,608 B2 | 6/2013 | Dow et al. |
| 8,468,012 B2 | 6/2013 | Lloyd et al. |
| 8,468,022 B2 | 6/2013 | Bringert et al. |
| 8,473,289 B2 | 6/2013 | Jitkoff et al. |
| 8,473,293 B1 | 6/2013 | Mengibar et al. |
| 8,473,296 B2 | 6/2013 | Grobauer et al. |
| 8,478,588 B2 | 7/2013 | Da Palma et al. |
| 8,478,592 B2 | 7/2013 | Patel |
| 8,484,023 B2 | 7/2013 | Kanevsky et al. |
| 8,484,024 B2 | 7/2013 | Kanevsky et al. |
| 8,484,030 B1 | 7/2013 | Pettay et al. |
| 8,489,398 B1 | 7/2013 | Gruenstein |
| 8,489,401 B1 | 7/2013 | Pettay |
| 8,490,016 B2 | 7/2013 | DeMaio et al. |
| 8,494,848 B2 | 7/2013 | Reding et al. |
| 8,504,369 B1 | 8/2013 | Chigier et al. |
| 8,504,371 B1 | 8/2013 | Vacek et al. |
| 8,509,398 B2 | 8/2013 | Kriese et al. |
| 8,510,412 B2 | 8/2013 | Kroeker et al. |
| 8,515,736 B1 | 8/2013 | Duta |
| 8,515,745 B1 | 8/2013 | Garrett et al. |
| 8,515,746 B1 | 8/2013 | Garrett et al. |
| 8,515,757 B2 | 8/2013 | Cross, Jr. et al. |
| 8,515,758 B2 | 8/2013 | Huo |
| 8,515,762 B2 | 8/2013 | Krumel et al. |
| 8,515,766 B1 | 8/2013 | Bringert et al. |
| 8,520,810 B1 | 8/2013 | Reding et al. |
| 8,521,523 B1 | 8/2013 | Garrett et al. |
| 8,521,526 B1 | 8/2013 | Lloyd et al. |
| 8,521,528 B2 | 8/2013 | Odinak |
| 8,521,539 B1 | 8/2013 | Teng et al. |
| 8,521,585 B2 | 8/2013 | Quilici et al. |
| 8,527,271 B2 | 9/2013 | Wandinger et al. |
| 8,532,985 B2 | 9/2013 | Seltzer et al. |
| 8,532,990 B2 | 9/2013 | Seltzer et al. |
| 8,532,991 B2 | 9/2013 | He et al. |
| 8,538,754 B2 | 9/2013 | Cohen et al. |
| 8,542,810 B2 | 9/2013 | Cohen et al. |
| 8,543,398 B1 | 9/2013 | Strope et al. |
| 8,543,404 B2 | 9/2013 | Moore et al. |
| 8,554,559 B1 | 10/2013 | Aleksic et al. |
| 8,554,755 B2 | 10/2013 | Richardson et al. |
| 8,560,310 B1 | 10/2013 | Zhang et al. |
| 8,560,327 B2 | 10/2013 | Neubacher et al. |
| 8,562,434 B2 | 10/2013 | Goller et al. |
| 8,566,087 B2 | 10/2013 | Cross, Jr. et al. |
| 8,566,091 B2 | 10/2013 | Low et al. |
| 8,571,851 B1 | 10/2013 | Tickner et al. |
| 8,571,859 B1 | 10/2013 | Aleksic et al. |
| 8,571,860 B2 | 10/2013 | Strope et al. |
| 8,571,869 B2 | 10/2013 | Deligne et al. |
| 8,583,441 B2 | 11/2013 | Berton et al. |
| 8,589,157 B2 | 11/2013 | Ju et al. |
| 8,589,162 B2 | 11/2013 | Lejeune et al. |
| 8,589,164 B1 | 11/2013 | Mengibar et al. |
| 8,593,501 B1 | 11/2013 | Kjeldaas |
| 8,599,704 B2 | 12/2013 | Wang et al. |
| 8,599,836 B2 | 12/2013 | Van Buren et al. |
| 8,600,742 B1 | 12/2013 | Gruenstein |
| 8,600,746 B1 | 12/2013 | Lei et al. |
| 8,600,763 B2 | 12/2013 | Brush et al. |
| 8,606,568 B1 | 12/2013 | Tickner et al. |
| 8,606,581 B1 | 12/2013 | Quast et al. |
| 8,611,505 B2 | 12/2013 | Oppenheim et al. |
| 8,612,230 B2 | 12/2013 | Agapi et al. |
| 8,612,231 B2 | 12/2013 | Grobauer et al. |
| 8,615,388 B2 | 12/2013 | Li et al. |
| 8,615,393 B2 | 12/2013 | Tashev et al. |
| 8,620,139 B2 | 12/2013 | Li et al. |
| 8,620,652 B2 | 12/2013 | Chambers et al. |
| 8,620,656 B2 | 12/2013 | Fu et al. |
| 8,620,657 B2 | 12/2013 | Farrell et al. |
| 8,620,667 B2 | 12/2013 | Andrew |
| 8,630,860 B1 | 1/2014 | Zhang et al. |
| 8,635,075 B2 | 1/2014 | Andrew |
| 8,644,488 B2 | 2/2014 | Byrd et al. |
| 8,645,128 B1 | 2/2014 | Agiomyrgiannakis |
| 8,645,134 B1 | 2/2014 | Harrenstien et al. |
| 8,645,136 B2 * | 2/2014 | Milstein ............... G10L 15/06 704/244 |
| 8,645,138 B1 | 2/2014 | Weinstein et al. |
| 8,650,029 B2 | 2/2014 | Thambiratnam et al. |
| 8,650,031 B1 | 2/2014 | Mamou et al. |
| 8,650,032 B2 | 2/2014 | Fu et al. |
| 8,654,933 B2 | 2/2014 | Doulton |
| 8,660,847 B2 | 2/2014 | Soemo et al. |
| 8,661,112 B2 | 2/2014 | Creamer et al. |
| 8,666,726 B2 | 3/2014 | Tremblay et al. |
| 8,666,743 B2 | 3/2014 | Schwarz et al. |
| 8,666,745 B2 | 3/2014 | Saffer |
| 8,666,750 B2 | 3/2014 | Buck et al. |
| 8,666,963 B2 | 3/2014 | Sejnoha et al. |
| 8,667,532 B2 | 3/2014 | Heath |
| 8,670,987 B2 | 3/2014 | Bergl et al. |
| 8,676,581 B2 | 3/2014 | Flaks et al. |
| 8,676,904 B2 | 3/2014 | Lindahl |
| 8,677,236 B2 | 3/2014 | Bower et al. |
| 8,682,659 B2 | 3/2014 | Kristjansson et al. |
| 8,682,661 B1 | 3/2014 | Schalkwyk et al. |
| 8,682,663 B2 | 3/2014 | Reding et al. |

(56) References Cited

U.S. PATENT DOCUMENTS

| | | |
|---|---|---|
| 8,682,676 B2 | 3/2014 | Burns et al. |
| 8,688,446 B2 | 4/2014 | Yanagihara |
| 8,688,452 B2 | 4/2014 | Lewis et al. |
| 8,689,251 B1 | 4/2014 | Heath |
| 8,693,466 B2 | 4/2014 | Johnson |
| 8,694,313 B2 | 4/2014 | Lloyd et al. |
| 8,694,316 B2 | 4/2014 | Pickering et al. |
| 8,694,322 B2 | 4/2014 | Snitkovskiy et al. |
| 8,700,393 B2 | 4/2014 | Aleksic et al. |
| 8,700,394 B2 | 4/2014 | Seltzer et al. |
| 8,700,400 B2 | 4/2014 | Pavey et al. |
| 8,700,594 B2 | 4/2014 | Apacible et al. |
| 8,705,519 B2 | 4/2014 | Jackson et al. |
| 8,706,483 B2 | 4/2014 | Gerl et al. |
| 8,706,490 B2 | 4/2014 | Cross et al. |
| 8,706,495 B2 | 4/2014 | Gschwendtner |
| 8,706,505 B1 | 4/2014 | Bringert et al. |
| 8,712,757 B2 | 4/2014 | Hamilton, II et al. |
| 8,712,770 B2 | 4/2014 | Fukuda et al. |
| 8,712,772 B2 | 4/2014 | Oez |
| 8,712,774 B2 | 4/2014 | Wiggs |
| 8,713,119 B2 | 4/2014 | Lindahl |
| 8,719,019 B2 | 5/2014 | Do et al. |
| 8,719,023 B2 | 5/2014 | Menendez-Pidal et al. |
| 8,719,024 B1 | 5/2014 | Moreno et al. |
| 8,719,035 B2 | 5/2014 | Stewart et al. |
| 8,725,492 B2 | 5/2014 | Odell et al. |
| 8,725,505 B2 | 5/2014 | Mowatt et al. |
| 8,725,512 B2 | 5/2014 | Claiborn et al. |
| 8,731,916 B2 | 5/2014 | Li et al. |
| 8,731,925 B2 | 5/2014 | Da Palma et al. |
| 8,731,927 B2 | 5/2014 | Schwarz |
| 8,731,928 B2 | 5/2014 | Rajput et al. |
| 8,731,937 B1 | 5/2014 | Reding et al. |
| 8,731,939 B1 | 5/2014 | Lebeau et al. |
| 8,738,376 B1 | 5/2014 | Goel et al. |
| 8,744,861 B2 | 6/2014 | Ativanichayaphong et al. |
| 8,745,025 B2 | 6/2014 | Sejnoha et al. |
| 8,750,463 B2 | 6/2014 | Doulton |
| 8,751,217 B2 | 6/2014 | Ballinger et al. |
| 8,756,175 B1 | 6/2014 | Szedegy |
| 8,762,150 B2 | 6/2014 | Edgington et al. |
| 8,762,152 B2 | 6/2014 | Bennett et al. |
| 8,762,156 B2 | 6/2014 | Chen |
| 8,762,469 B2 | 6/2014 | Lindahl |
| 8,767,928 B2 | 7/2014 | Springer |
| 8,768,695 B2 | 7/2014 | Tang et al. |
| 8,768,698 B2 | 7/2014 | Mengibar et al. |
| 8,768,701 B2 | 7/2014 | Cohen et al. |
| 8,768,723 B2 | 7/2014 | Montyne et al. |
| 8,768,969 B2 | 7/2014 | Huerta et al. |
| 8,774,392 B2 | 7/2014 | Odinak et al. |
| 8,775,175 B1 | 7/2014 | Nagel et al. |
| 8,775,180 B1 | 7/2014 | Pettay et al. |
| 8,775,183 B2 | 7/2014 | Hamaker et al. |
| 8,775,189 B2 | 7/2014 | Burns et al. |
| 8,781,826 B2 | 7/2014 | Kooiman |
| 8,781,832 B2 | 7/2014 | Comerford et al. |
| 8,781,833 B2 | 7/2014 | Duta et al. |
| 8,793,130 B2 | 7/2014 | Wang et al. |
| 8,798,239 B2 | 8/2014 | Stifelman et al. |
| 8,798,995 B1 | 8/2014 | Edara |
| 8,798,997 B2 | 8/2014 | Grobauer et al. |
| 8,805,345 B2 | 8/2014 | Ling et al. |
| 8,805,684 B1 | 8/2014 | Aleksic et al. |
| 8,811,592 B1 | 8/2014 | Pettay et al. |
| 8,812,316 B1 | 8/2014 | Chen |
| 8,812,325 B2 | 8/2014 | Burns et al. |
| 8,818,797 B2 | 8/2014 | Acero et al. |
| 8,818,809 B2 | 8/2014 | Reding et al. |
| 8,825,478 B2 | 9/2014 | Cox et al. |
| 8,825,481 B2 | 9/2014 | Thambiratnam et al. |
| 8,830,165 B1 | 9/2014 | Heath et al. |
| 8,831,185 B2 | 9/2014 | Gandhi et al. |
| 8,831,930 B2 | 9/2014 | Strope et al. |
| 8,831,946 B2 | 9/2014 | Mamou |
| 8,831,950 B2 | 9/2014 | Moore et al. |
| 8,831,951 B2 | 9/2014 | Cohen |
| 8,831,956 B2 | 9/2014 | Morgan et al. |
| 8,831,957 B2 | 9/2014 | Taubman et al. |
| 8,832,804 B1 | 9/2014 | Casey et al. |
| 8,838,434 B1 | 9/2014 | Liu |
| 8,838,448 B2 | 9/2014 | Jiang et al. |
| 8,838,449 B2 | 9/2014 | Ju et al. |
| 8,843,370 B2 | 9/2014 | Willett et al. |
| 8,843,376 B2 | 9/2014 | Cross, Jr. |
| 8,849,664 B1 | 9/2014 | Lei et al. |
| 8,849,791 B1 | 9/2014 | Hertschuh et al. |
| 8,856,004 B2 | 10/2014 | Basson et al. |
| 8,862,467 B1 | 10/2014 | Casado et al. |
| 8,862,468 B2 | 10/2014 | Paek et al. |
| 8,862,475 B2 | 10/2014 | Ativanichayaphong et al. |
| 8,868,409 B1 | 10/2014 | Mengibar et al. |
| 8,868,425 B2 | 10/2014 | Maes et al. |
| 8,868,428 B2 | 10/2014 | Gruenstein et al. |
| 8,874,442 B2 | 10/2014 | Aley-Raz et al. |
| 8,874,447 B2 | 10/2014 | Da Palma et al. |
| 8,874,448 B1 | 10/2014 | Kauffniann et al. |
| 8,880,398 B1 | 11/2014 | Aleksic et al. |
| 8,886,524 B1 | 11/2014 | Watanabe et al. |
| 8,886,532 B2 | 11/2014 | Levit et al. |
| 2014/0278428 A1* | 9/2014 | Rolland .................. G10L 15/26 704/257 |

OTHER PUBLICATIONS

Kushalnagar, et al., "Captions Versus Transcripts for Online Video Content" W4A2013—Communication, May 13-15, 2013, Rio de Janeiro, Brazil. Co-Located with the 22nd International World Wide Web Conference. Copyright 2013 ACM, 4 pages.*

* cited by examiner

METHOD AND SYSTEM FOR DYNAMIC SPEECH RECOGNITION AND TRACKING OF PREWRITTEN SCRIPT

PRIORITY

This application claims benefit to U.S. Provisional Patent Ser. No. 62/044,506 filed on Sep. 2, 2014.

FIELD OF THE INVENTION

The invention relates generally to speech recognition software and techniques and more specifically to a system and method for providing a dynamic teleprompter application for automatically scrolling the text of a speech given by a user based on speech recognition.

BACKGROUND OF INVENTION

Teleprompters are known in the art. Those speaking publicly may utilize a teleprompter to read from when giving a speech. The teleprompter displays the words of the script from which the reader is to read aloud. Teleprompters normally scroll through the script manually as chosen by a speaker. When a teleprompter is set at a constant rate the reader may fall behind the script and get lost or may read faster than the script and have to wait for the script to catch up. When a speaker moves the script manually and the speaker goes off script for a period of time, the speaker may forget to progress the script when the speaker goes back on script. Additionally, if a speaker wishes to jump ahead and skip a certain section then it would be difficult to quickly jump ahead to the specific section manually. What is needed is a system and method by which a written script is tracked and presented to a reader by recognizing the words that are being spoken orally and presenting the section of the script being read or heard at that time.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The invention is directed toward a computer-implemented method for dynamically presenting a prewritten text in a graphical user interface. The method comprises receiving a text artifact, the text artifact containing a plurality of artifact words, storing, via a processor, the text artifact in a memory device of a computer, retrieving, via the processor, the text artifact, displaying the text artifact on the display screen of the computer, receiving a vocal input, generating, via the processor, a text file representing the words spoken in the vocal input, the text file containing a plurality of hypothesis words, comparing, via the processor, a predetermined number of the hypothesis words to a predetermined number of the artifact words, determining a match location in the text artifact where a specific number of the predetermined number of hypothesis words match a specific number of the predetermined number of artifact words, and altering, via the processor, the display on the display screen to display the match location on the display screen of the computer. The method may further comprise highlighting on the display of the computer screen one or more artifact words within the match location of the text artifact.

The method of highlighting may comprise altering the font of one or more artifact words on the display screen, altering the color of the font of one or more artifact words on the display screen, or creating a rectangular box surrounding one or more artifact words on the display screen of the computer.

The method may further comprise determining whether one or more words of the plurality of hypothesis words have been matched to a match location of the text artifact and removing one or more words from the plurality of hypothesis words, wherein the removed words have been previously matched to a match location of the text artifact. The method may further comprise determining whether the plurality of hypothesis words number four or more.

The method may further comprise retrieving twenty words of the text artifact following the match location and comparing, via the processor, a predetermined number of the hypothesis words to the twenty words of the text artifact following the match location.

The method may further comprise determining, via the processor, the font size of the text of the text artifact as displayed on the display screen, determining, via the processor, the orientation of the electronic screen displaying the text of the text artifact, and altering, via the processor, the predetermined number of artifact words utilized for comparing to the predetermined number of hypothesis words.

In one embodiment of the invention the step of comparing the predetermined number of the hypothesis words to the predetermined number of the artifact words comprises creating a first group containing the predetermined number of hypothesis words, creating a second group containing the predetermined number of artifact words, the second group being displayed on the display screen of the computer, respectively determining whether each of the predetermined number of hypothesis words is present in the first group, respectively determining whether each of the predetermined number of artifact words is present in the first group, and generating a single number, wherein the single number is representative of the degree of similarity between the first group and the second group.

In another embodiment of the invention the method may further comprise determining two or more second groups of the predetermined number of artifact words having a generated single number greater than a predetermined number, creating a list of all bigrams contained in the predetermined number of hypothesis words, creating a list of all trigrams contained in the predetermined number of hypothesis words, respectively creating a list of all bigrams contained in each of the two or more second groups, respectively creating a list of all trigrams contained in each of the two or more second groups, respectively comparing each list of bigrams of the two or more second groups to the list of all bigrams contained in the predetermined number of hypothesis words, respectively comparing each list of trigrams of the two or more second groups to the list of all trigrams contained in the predetermined number of hypothesis words, determining one of the two or more second groups of the predetermined number of artifact words having the greatest total number of bigrams and trigrams present in the list of all bigrams and the list of all trigrams contained in the predetermined number of hypothesis words, selecting the one of the two or more second groups of the predetermined number of artifact words having the greatest total number of bigrams and trigrams present in the list of all bigrams and the list of all trigrams contained in the predetermined number of hypothesis words, and selecting a portion of the text artifact, wherein the selected portion of text artifact contains the selected one of the two or more second groups of the predetermined number of artifact words having the greatest total number of bigrams and trigrams present in the list of all bigrams and the list of all trigrams contained in the predetermined number of hypothesis words.

In another embodiment of the invention the method may further comprise establishing a scroll rate for the text artifact on the display screen of the computer. The method may further comprise increasing the scroll rate when a speaker's location in the text artifact is ahead of the highlighting. The method may further comprise decreasing the scroll rate when a speaker's location in the text artifact is behind the highlighting.

Still other embodiments of the present invention will become readily apparent to those skilled in this art from the following description wherein there is shown and described the embodiments of this invention, simply by way of illustration of the best modes suited to carry out the invention. As it will be realized, the invention is capable of other different embodiments and its several details are capable of modifications in various obvious aspects all without departing from the scope of the invention. Accordingly, the drawing and descriptions will be regarded as illustrative in nature and not as restrictive.

BRIEF DESCRIPTION OF THE DRAWINGS

Various exemplary embodiments of this invention will be described in detail, wherein like reference numerals refer to identical or similar components, with reference to the following figures, wherein.

DETAILED DESCRIPTION OF THE PREFERRED EMBODIMENT

Figure 1:
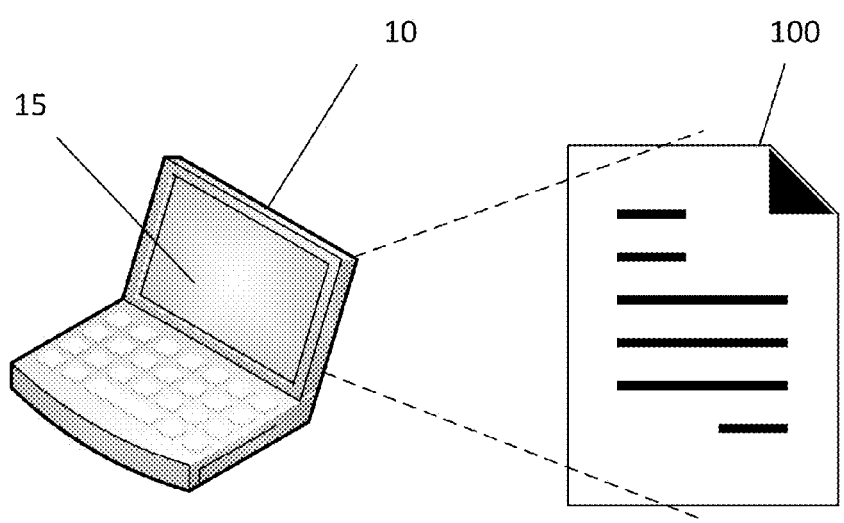
FIG. 1 is a view of the system of the invention.

The claimed subject matter is now described with reference to the drawings. In the following description, for purposes of explanation, numerous specific details are set forth in order to provide a thorough understanding of the claimed subject matter. It may be evident, however, that the claimed subject matter may be practiced with or without any combination of these specific details, without departing from the spirit and scope of this invention and the claims.

As used in this application, the terms "component", "module", "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component.

The invention pertains to a method and system utilizing speech recognition to locate a specific location in a prewritten script (also known as a text artifact). The method may further provide for graphically presenting a section of the prewritten script to a user. The graphical representation of the prewritten script may display any amount of the prewritten script. In the preferred embodiment, the graphical presentation of the prewritten script displays the section where the speech recognition locates the speaker as reading from. The speaker's place may be highlighted or otherwise shown in a distinctive manner. In the preferred embodiment a small section of the prewritten script before this location is displayed and a small portion of the prewritten script after this section is displayed. These three portions may be of any size and display any number of words. In this method a computer system and program is utilized to receive an auditory input of spoken words. The computer system then creates a number of hypotheses about the words being spoken. The computer system cross references the hypotheses of the spoken words with the prewritten script. The computer system then locates the specific section of the prewritten script from where the words are being spoken. The system and method may be used for any purpose, on any computerized device, including but not limited to a desktop computer, a laptop computer, a tablet computer, a wireless cellular phone, or any other computerized device. The specific manner utilized to perform the method of the invention may be any number of ways. There may be variations in the specific mechanisms utilized without varying from the scope of the invention.

The software utilized for performing the invention may have a multitude of additional features. The system and method of the invention may be practiced with or without the additional features. The software may allow for a user to create an audio recording of any speech as it is given. The system stores the audio file of the recording in a file which may be associated with the prewritten script. The software may allow for a user to turn off the automatic scrolling function so that the user can scroll manually through the prewritten script. Alternatively, the user may set the prewritten script to advance at a set rate. The set rate may be any number of words per minute as desired by the user. The software may utilize a clock or timer. The timer can display the total time that the speaker has been speaking for. Alternatively, the user can input a set time as a time limit for the speech. The timer will then count down, displaying the time left, and will alert the user when the remaining time has run out and the user is out of speaking time. The system may allow a user to type a prewritten script directly into the software application and store for later utilization. Alternatively, the user may type a prewritten script in a separate software application and then utilize the file created in the software. The user may customize the settings of the software, such as standard font size and microphone sensitivity levels. The system may permit the user to create a password protected user ID to utilize the software. The system may permit the user to only view the prewritten scripts associated with that user's user ID. Multiple users may utilize the software system on a single device by each having a unique user ID. The system may permit users to share prewritten scripts with other users. The system may permit a user to friend other users of the system. The system may store prewritten scripts on a third party server and permit a user to store and retrieve prewritten scripts remotely through an internet connection. The software may contain a search function. The search function may permit a user to search through titles of prewritten scripts. The search function may permit a user to search through the content of multiple prewritten scripts to find prewritten scripts containing specific keywords and choose one for presentation. The search function may permit a user to search for a keyword or phrase within a prewritten script during the reading of the prewritten script. This function would permit the user to search and find a specific section of the prewritten script so the user may start reading from that section.

Although the specific manner of performing the method may be performed through a number of separate embodiments, only the preferred embodiment will be described in detail. In the preferred embodiment, a speech recognition algorithm recognizes the words being spoken by a user and creates a series of hypotheses of the words being spoken. A matching algorithm matches the hypothesis generated to a prewritten script. The matching algorithm may make a match with any number of words or phonemes received. In the preferred embodiment, a minimum of three words is needed to match against the prewritten script. The matching algorithm may attempt to match the hypothesis received against any number of words or part of the prewritten script. In the preferred embodiment the algorithm attempts to match the hypothesis against the next twenty words in the prewritten script appearing after the last positive match. The match may be made with or without reference to the order of the words in the prewritten script. Thus if all words in a hypothesis are present in a portion of the prewritten script (even if not in the same order) then a positive match may be made. The matching algorithm may or may not authenticate the matched location. The algorithm may authenticate a positive match by verifying that the order of the words in the matched portion of the prewritten script is identical to the order of words in the hypothesis.

Figure 2:
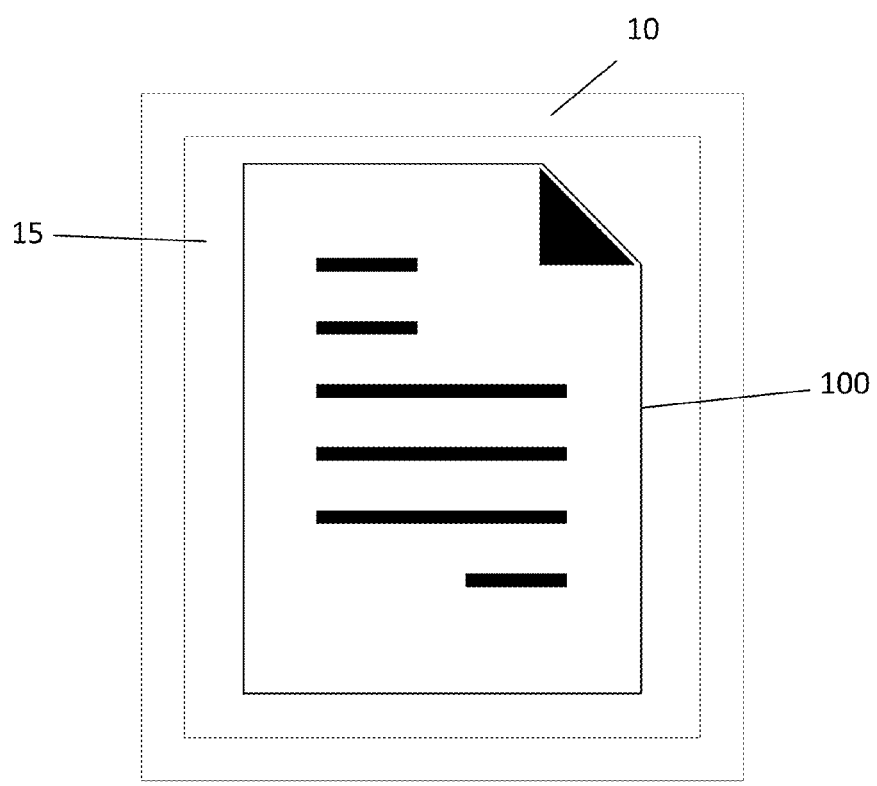
FIG. 2 is a view of the system of the invention.

Referring to FIG. 1 and FIG. 2, the invention is performed on a computerized device 10 with a display screen 15. The display screen 15 displays the text artifact 100. In the preferred embodiment the display screen 15 is integral to the body of the computerized device 10. In other embodiments the display screen 15 is separate from the computerized device 10. The computerized device 10 receives the vocal input of the user through a microphone. The microphone may be integral to the body of the computerized device 10 or separate from the computerized device 10. The display screen 15 displays the text artifact 100 in accordance with the instructions from the computerized device 10. As shown in FIG. 1, the computerized device 10 may be a laptop style computer or, as shown in FIG. 2, the computerized device 10 may be a tablet style computer or smartphone.

Figure 3:
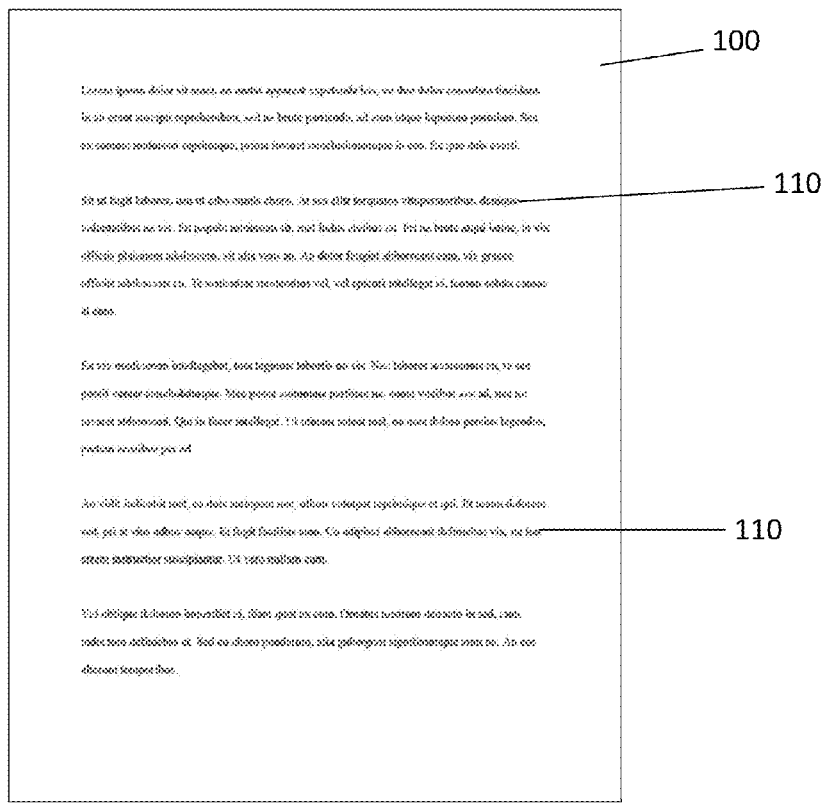
FIG. 3 is a view of a text artifact.
Figure 4A:
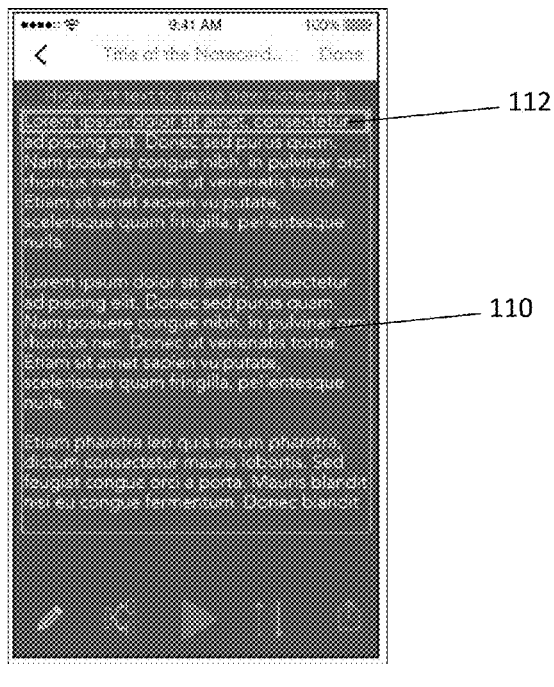
FIG. 4A is a view of a device utilizing the invention.
Figure 4B:
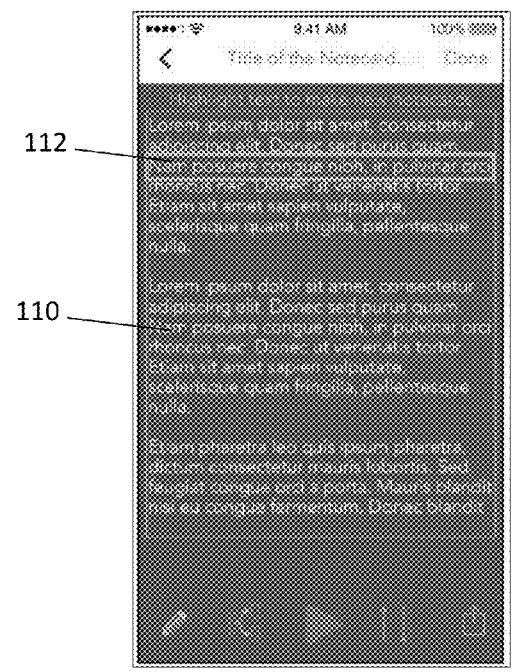
FIG. 4B is a view of a device utilizing the invention.

At the heart of the matching algorithm is the ability for the app to take a hypothesis fed to it by the speech recognition algorithm and match it to the right piece of text within the script that corresponds to the user's current location in the script. As shown in FIG. 3, the text artifact 100 contains a plurality of lines of text 110. The matching algorithm determines the specific line of text 110 which the vocal input matches and adjusts the text artifact 100 on the display 15 of the computerized device 10. As shown in FIG. 4A and FIG. 4B, the computerized device 10 receives the vocal input of the speaker, matches the vocal input to a specific line of text 110, and highlights the location of the specific line of text 110 on the display screen 15. As shown in FIGS. 4A and 4B, the highlight 112 distinctly points out to the user the section from which the user is reading. As shown in FIG. 4A, the highlight 112 is a colored box surrounding the specific line of text 110 of the text artifact 100 that the speaker is reading from. As the speaker progresses through the text artifact 100 the highlighting 112 progresses with the speaker. As shown in FIG. 4B, the highlighting 112 moves lower down the text artifact 100 on the display 15 of the computerized device 10.

The algorithm which is used to achieve this must also adhere to the following requirements:
  Accurately match the last spoken hypothesis to the closest match to it in the text from the user's current location.
  Discard any speech made by the user which does not correspond to any part of the text.
  Avoid skipping forward in the document that might result of incorrectly matching the current hypothesis to the wrong text in the Script.

In the preferred embodiment, the matching algorithm relies on input generated by the speech recognition algorithm. As a user speaks, the speech recognition algorithm generates and passes hypotheses of the words it has detected to be spoken to the matching algorithm. As hypotheses are generated by the speech recognition algorithm, the matching algorithm attempts to match these to the words within the text being presented. The matching algorithm keeps track of the current line of text that the presenter is detected to be on and attempts to match the hypotheses generated by the speech recognition algorithm to the next 20 words of text from the line that the user is detected to be on.

For every hypothesis generated the matching algorithm performs the following processing steps:
  Hypothesis Refinement
  Cosine Distance Match
  N-Gram Analysis Match These processing steps may be performed independently from each other and not all steps must be performed. For instance, the algorithm may forego the hypothesis refinement or may forego the N-Gram analysis. The N-Gram analysis may only be performed if necessary.

Figure 5:
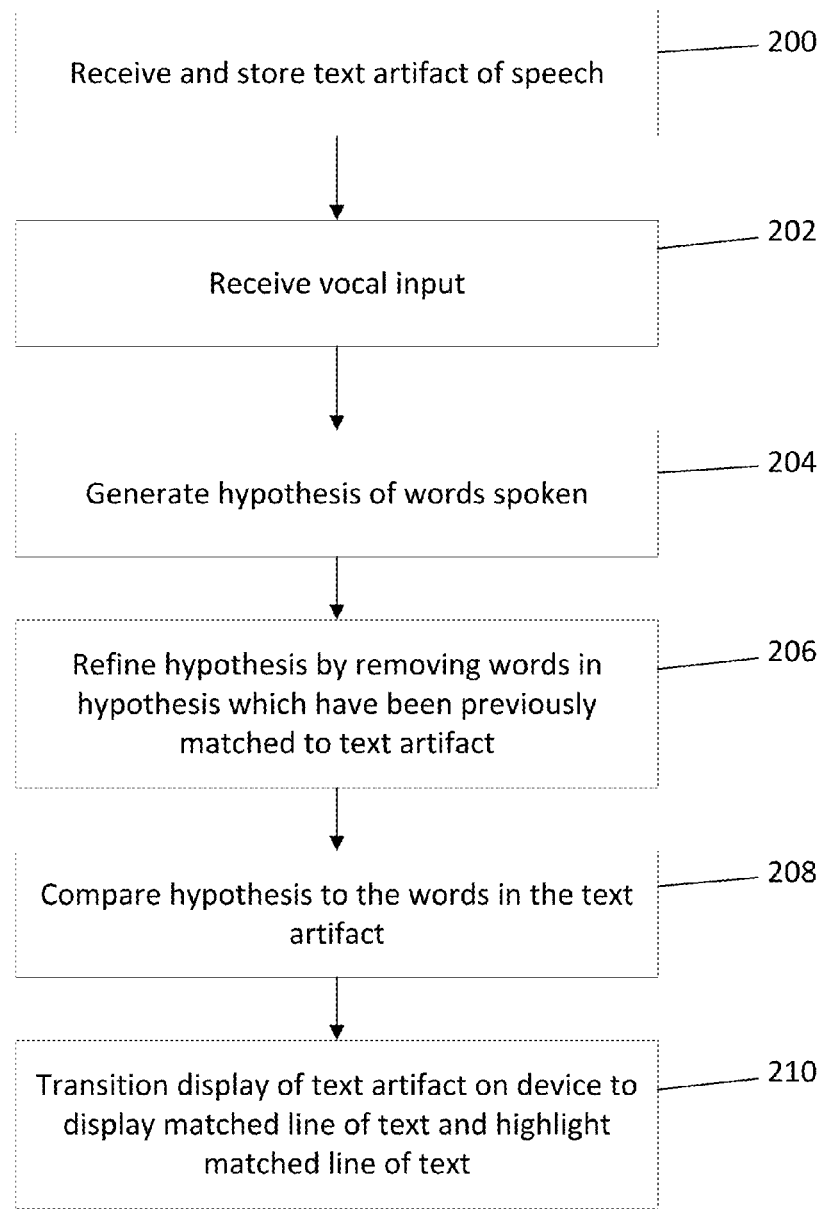
FIG. 5 is a schematic displaying the method of the invention.

Referring to FIG. 5, the broad method of the invention is displayed. First the computerized device receives and stores a text artifact of the speech to be read by the user 200. Then the computerized device receives the vocal input of the user 202. The computerized device then generates a hypothesis of the words spoken 204. The computerized device refines the hypothesis by removing words from the hypothesis which have been previously matched to the text artifact 206. The computerized device compares the hypothesis to the words in the text artifact 208. The computerized device then transitions the display of the text artifact to display the matched line of text and could highlight the matched line of text 210.

Figure 6:
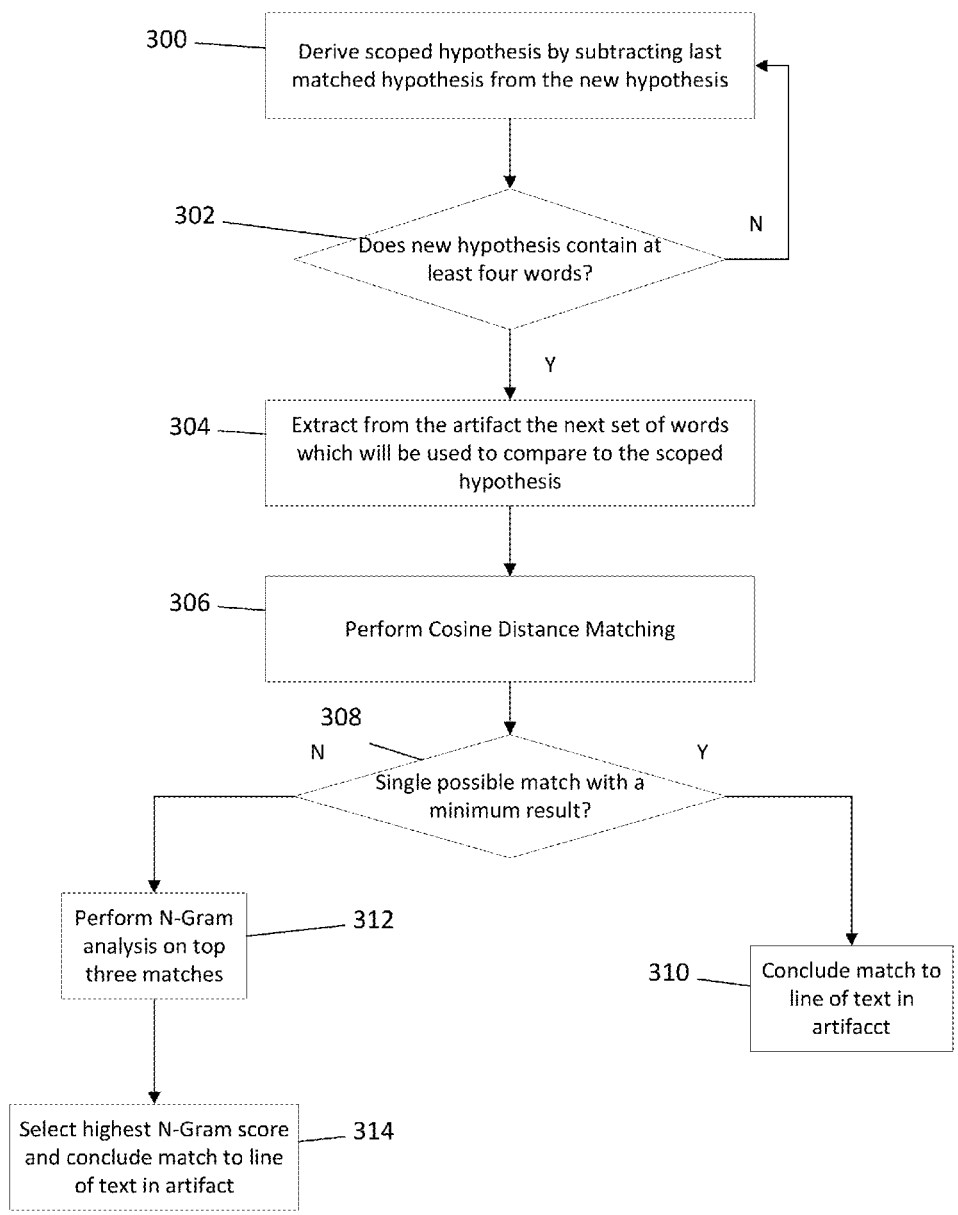
FIG. 6 is a schematic displaying the method of the invention.

Referring to FIG. 6, the detailed embodiment of the method is displayed. First the computerized device derives a scoped hypothesis by subtracting the last matched hypothesis from the new hypothesis 300. The system then determines whether the scoped hypothesis contains at least four words 302. If the hypothesis does not contain at last four words then the system continues to receive vocal input until the scoped hypothesis contains at least four words. The system then extracts from the text artifact the next set of words which will be used to compare to the scoped hypothesis 304. The system performs a cosine distance matching function 306 and generates a number corresponding to the level of match between a specific section of the text artifact and the hypothesis. In the preferred embodiment, the system requires a minimum output number from the cosine distance matching function to determine a match from the hypothesis and a section of the text artifact. The system then determines whether there is a single possible match in the text artifact which has the minimum output number 308. If the system determines that there is a single section of text artifact with a match greater than the minimum required value then the system concludes that there is a match to that specific section of text in the text artifact 310. If there are multiple sections of text which have a score over the minimum level then the system performs an n-gram analysis on the highest three possible matches 312. The system then selects the section of the text artifact with the highest n-gram score and concludes that there is a match with the text artifact 314.

In the preferred embodiment of the hypothesis refinement, the following process is followed. A speech recognition algorithm generates hypotheses which are not mutually exclusive of each other. That is as a user speaks a sentence, the speech recognition algorithm may generate X hypotheses with each hypothesis being composed up of all words in the previous hypothesis appended with a single new word. The speech recognition algorithm may continue to generate hypotheses by appending newly detected words on an ongoing sentence or may reset and generate a hypothesis with just the last word it has detected.

The first step of the matching algorithm is to refine the hypothesis and pull out only those words which are new or which haven't been matched as part of the last hypothesis that was attempted to be matched by the matching algorithm. This scoped down hypothesis becomes the piece of text which is attempted to be matched against the next set of 20 words in the document. The algorithm will only attempt to match a scoped hypothesis which has at least 4 words, otherwise it skips processing of it and waits until a hypothesis can be created with at least 4 words.

For example, for the following text: "Turning once again, and this time more generally, to the question of invasion", the following hypotheses may be generated by a speech recognition algorithm as a user reads the text:
1. Turning
2. Turning once
3. Turning one
4. Turning once again
5. Turning once again an
6. Turning once again and this
7. Turning once again and this time
8. Turning once again and this time more generically
9. Turning once again and this time more generally to the
10. Turning once again and this time more generally to the question In the preferred embodiment of the cosine distance matching, the following process is followed. Once a scoped down hypothesis has been generated by the matching algorithm the next step in the match algorithm is to look at the next X words of text in the document and attempt to determine a measurement of the similarity between the generated text and the text within the document. The value of X is variable and may be defined in any manner. In the preferred embodiment the value of X is defined based on the font size used and the device screen size.

The first part of the match algorithm uses a Cosine Distance Matching algorithm to break down the scoped hypothesis and the next 20 words of text in the document to measure the number of words between the two that match.

The pseudo code for the Cosine Distance algorithm resembles this:
Given an array H that contains the scoped hypothesis of length k words.
Given a vector V which contains each unique word in H and the number of times it appears in H.
Given an array T that contains the next X words of the text document.
1.) Retrieve the next k words of text from T, Tw.
2.) Create a vector Vw which is the same length as V.
3.) For every unique word in Tw which is also found in V, set the value in Vw at the same index to 1.
4.) Perform a dot-product calculation on Vw against V. If the dot product is greater than 0, then store the result for that window of text as Rw.
5.) Go to 1 and repeat until no more words in T to process.

At the end of this process, the algorithm has a list of all dot products (Rw) for each window of text from T that was analyzed. If the algorithm ends with more than 3 windows of text that have a non-zero dot product, the algorithm then uses N-Gram analysis to further analyze and identify the best match in the text.

If the algorithm ends with only 1 window of text that produces a non-zero dot product, then that window of text is determined to be the best match for the hypothesis H. If the algorithm outputs no windows of text with a non-zero dot product, then the hypothesis is not matched against any part of the text and processing stops until the next hypothesis is received.

Figure 7:
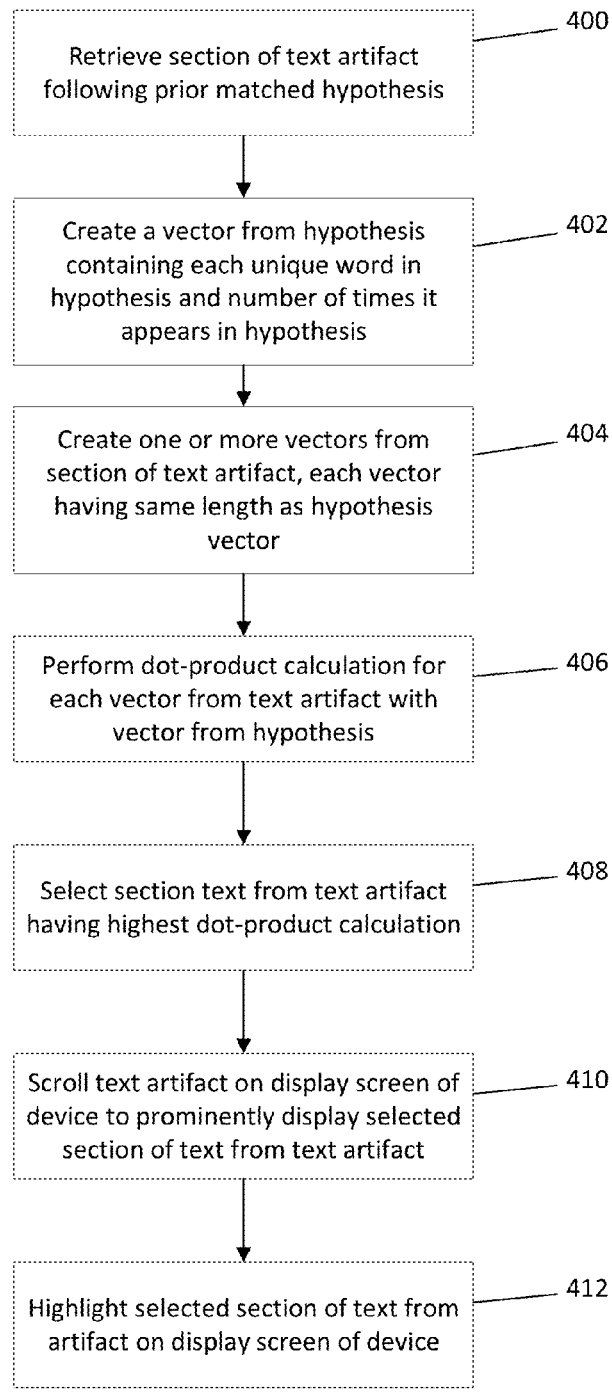
FIG. 7 is a schematic displaying the method of the invention.

This process is illustrated in FIG. 7. First the system retrieves the section of text artifact following the prior matched hypothesis 400. The system then creates a vector containing each unique word in the hypothesis and the number of times it appears in the hypothesis 402. The system then creates one or more vectors from the section of text artifact, with each vector having the same length as the hypothesis vector 404. The system then performs a dot-product calculation for each vector from the text artifact with the vector from the hypothesis 406. The system then selects the section of text from the text artifact having the highest dot-product calculation result 408. The system then scrolls the text artifact on the display screen of the device to prominently display the selected section of text from the text artifact 410. The system then may highlight the selected section of text from the artifact on the display screen of the device 412.

The following is an illustration of the cosine distance matching function performed by the system. The cosine distance matching function is represented by the following algorithm:

$$A \cdot B = \sum_{i=1}^{n} A_i B_i = A_1 B_1 + A_2 B_2 + \ldots + A_n B_n$$

As represented in the function the hypothesis would be represented by A and the text artifact would be represented by B. The first word of the hypothesis would be represented by $A_1$, the second word of the hypothesis would be represented by $A_2$, and so on. The first word of the text artifact would be represented by $B_1$, the second word of the text artifact would be represented by $B_2$, and so on.

The number for each spot in the vector for the hypothesis is a 1 because the word is present in the text artifact. The words in the section of text artifact are then compared to the hypothesis. If the word in the text artifact is present in the hypothesis then the spot for that word is represented by a 1 in the vector. If the word is not present in the hypothesis then the spot for that word is represented by a zero. The dot product function then gives a number for that specific section of the text artifact. The higher the number as a result the more likely that specific section of text artifact is a match to the hypothesis.

As an illustration of the cosine distance matching function, and by no means limiting the scope of the invention, assume that the hypothesis of the vocal input is "The big dog bit the small dog." In this illustration the next section of text artifact to be matched is "The dog was bit on his leg." The system creates a vector of the hypothesis where V=(the, big, dog, bit, the, small, dog). Since each of these words are in the hypothesis then the numerical representation of the vector is V=(1, 1, 1, 1, 1, 1, 1). The system creates a vector for the next section of text artifact where Vw=(the, dog, was, bit, on, his, leg). Represented numerically Vw=(1, 1, 0, 1, 0, 0, 0). If a word in a specific spot is present in the hypothesis then it is represented by a 1. If it is not present then it is represented by a 0. The system performs a dot product of V and Vw. In this instance, V·Vw=(1×1+1×1+1×0+1×1+1×0+1×0+1×0)=1+1+0+1+0+0+0=3. In this instance, the next section of text results in a dot product result of 3. If the next words in the text artifact are "The big dog bit the small dog" then the system performs a dot product in the same manner. The result of the dot product for this section of the text artifact is 7. Because 7 is greater than 3 the system determines a match at the section of text artifact reading "The big dog bit the small dog." The system then scrolls the display of the text artifact to display "The big dog bit the small dog" and further highlights the section of the text artifact containing the words "The big dog bit the small dog."

The Cosine Distance algorithm while giving a measure in the similarity of the two pieces of text contains no provision for the order of the words. Hence if there are 3 or more non-zero dot products, the algorithm performs N-Gram Analysis which does take into account the order of words to identify which window of text is the best match for the hypothesis.

In the preferred embodiment of the N-Gram analysis, the following process is followed. The N-Gram analysis takes as an input the top 3 candidate matches from the document outputted by the Cosine Distance formula and then analyzes them to identify which one of them best matches the scoped hypothesis taking into account the order of the words. The N-Gram analysis performs an analysis of the candidate matches and generates a score indicating the strength of the match that does take into account the order of the words. An example of how N-Gram analysis is performed is as follows:

Given a hypothesis H,
A list of all bigrams in H: Bh
A list of all trigrams in H: Th
For each window of text Tw:
1.) Extract all the bigrams of Tw into Bw.
2.) Extract all the trigrams of Tw into Triw.
3.) Count the number of elements in Bw which match Bh.
4.) Count the number of elements in Triw which match Th.
5.) Add the output of 3.) and 4.) and assign that as the N-gram score for Tw.

Once all the N-gram scores have been calculated, the algorithm chooses the window of text (Tw) which has the highest N-gram score to be the best match to the scoped hypothesis.

To improve the accuracy of the N-Gram score and to reduce the instances of false positives being matched (i.e. when the user goes off script, the algorithm needs to be smart enough to not generate any matches against the text), the N-Gram analysis filters and ignores any bigrams or trigrams that match any 1 of the 70 of the most common articles found in the English language. Any N-gram which is generated that matches one of the articles in this list of 70 is ignored by the analysis and does not contribute to the final scoring.

Figure 8:
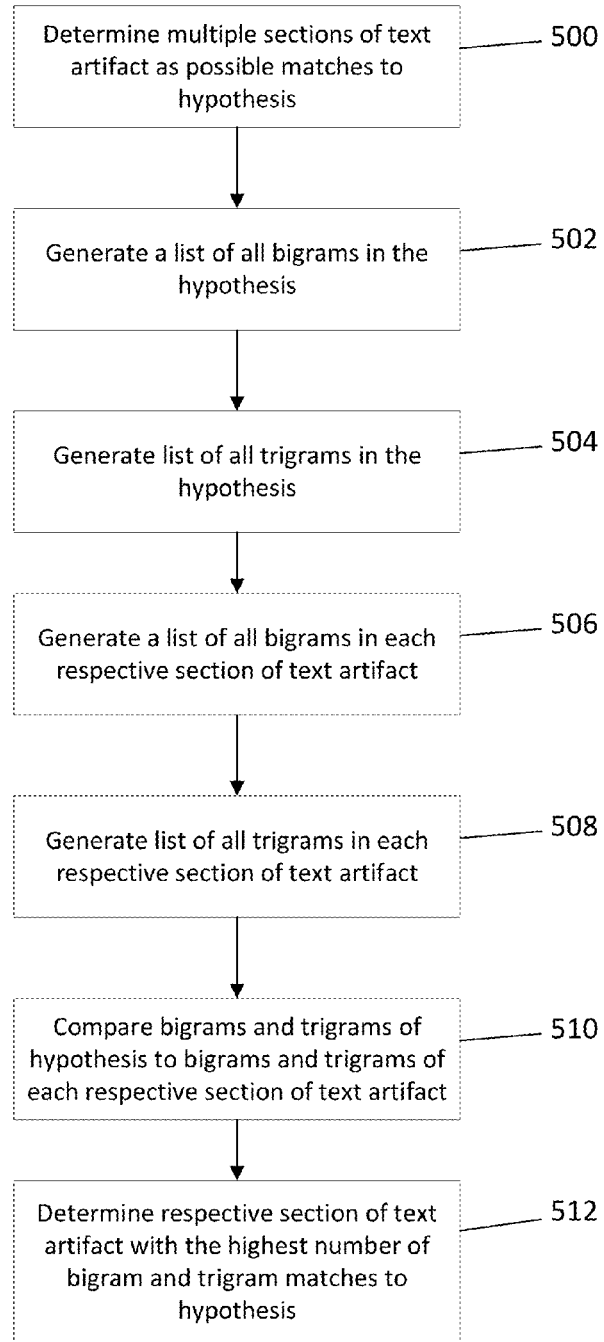
FIG. 8 is a schematic displaying the method of the invention.

The N-gram analysis process is illustrated in FIG. 8. The system first determines that there are multiple sections of the text artifact as possible matches to the hypothesis 500. The system then generates a list of all bigrams in the hypothesis 502. The system then generates a list of all trigrams in the hypothesis 504. The system generates a list of all bigrams in each respective section of text artifact 506. The system then generates a list of all trigrams in each respective section of text artifact 508. The system then compares the bigrams and trigrams of the hypothesis to the bigrams and trigrams of each respective section of the text artifact 510. The system then determines the section of text artifact with the highest number of bigram and trigram matches to the hypothesis 512. In this process the order of the words are taken into account. The bigrams are composed of two phonemes, two syllables, or two words which are presented in side by side in direct progression. The trigrams are composed of three phonemes, three syllables, or three words which are presented in direct order.

In the preferred embodiment at the end of the Cosine Distance and N-Gram analysis, the matching algorithm takes the window of text Tw that is determined to be the best match against the hypothesis and identifies the line number in the document that that window corresponds to. Once the algorithm has detected that it is on a particular line of text in the document then the next time a hypothesis is analyzed it will only attempt to match against words of text taken from the next line.

In one embodiment of the invention, the process is performed by a computer matching algorithm. A separate algorithm receives an auditory input of a speaker's voice and creates a series of hypotheses of the words being spoken. The matching algorithm receives an input of these series of hypotheses of the spoken words. The matching algorithm then performs the following steps—

1.) Derive a scoped hypothesis which is the subtraction of the last matched hypothesis from the new hypothesis.
2.) Does the scoped hypothesis have at least 4 words in it? If yes, continue to 3. If no, then stop processing and wait for the next hypothesis.
3.) Extract from the artifact the next set of words which will be used to compare the scoped hypothesis against.
4.) Perform Cosine Distance matching step
5.) Did the Cosine Distance step produce a single possible match with a distance score of at least 3.0? If yes, then we conclude that the scoped hypothesis to be matched on the line of text that begins the possible match, we increment the current line marker and wait for the next hypothesis. If no and there are more than 1 possible matches, continue to 6.). If no and there are no possible matches with a score of at least 3.0, then stop processing and wait for the next hypothesis.
6.) Take the top 3 possible matches from the Cosine Distance step and perform an N-Gram analysis.
7.) Select the possible match which has the highest score in the N-Gram analysis and conclude that the scoped hypothesis to be matched on the line of text that the possible match begins on. Increment the current line marker and wait for the next hypothesis to process.

In a separate component of the method and system, the invention provides for the ability to dynamically change the start location of the prewritten script. This component permits the user to pause and restart of the tracking of the reading of the prewritten script. The software tracks the location of the prewritten script from where the user is reading. The user may view the prewritten script on a computerized presentation device with a touch screen user interface. The user may move the location of the prewritten script by touching the touch screen user interface and dragging through the prewritten script to a different location. The user may scroll through the prewritten script manually in this manner. The user may scroll forward in the prewritten script to skip a certain section or may scroll backward in the prewritten script to review or repeat a prior section. In this component the speech recognition software automatically tracks the movement made by the user and resets to track the speech of the user from the location that the user moved to. The software tracks this move by the user automatically without the user needing to reset the starting or tracking point.

In a specific example of the utilization of this component, and by no means limiting the scope of this component, a user may start at the first paragraph of a prewritten script. The system tracks the location of the speaker as the speaker reads from the first paragraph. If, when the speaker reaches the second paragraph, the speaker decides to skip the second paragraph and read from the third paragraph, the user can touch the screen and swipe the prewritten script forward to the third paragraph. The speaker then starts reading from the prewritten script at the third paragraph. The system starts tracking the location that the speaker is reading from and presenting the third paragraph of the prewritten script to the user. The software automatically starts tracking from this new location.

In a separate component of the invention, the method and system provide for highlighting a specific word, region, or portion of the prewritten script that is matched by the speech recognition software. The highlighting method is performed in real time as the speaker reads from the prewritten script. The highlighting is performed by the software as a means of presenting to the speaker the portion of the prewritten script that the speaker is reading from so that the speaker may keep track of the speaker's location during reading from the prewritten script. In one specific example of one embodiment of this component, and in no way limiting the scope of this component, the method performed by this component matches the location of the prewritten script from which the speaker is reading. The software then presents the location of the prewritten script that the speaker is reading from in highlighted format. For instance, the highlighted section may be presented on a line by line basis. The line before the line from which the speaker is reading is presented in normal format. The line after the line from which the speaker is reading is presented in normal format. The line between the two, the line from which the speaker is reading, is presented in a highlighted format. As the reader progresses reading through the prewritten script the highlighted format progresses through the prewritten script along with the speaker. As the speaker reaches the next line the highlighted formatting moves to the next line as well. The prior line which was highlighted as the speaker read from it is no longer presented in a highlighted format once the speaker is no longer reading from that line of the prewritten script. In other embodiments of this component, the highlighted formatting may be presented on a word by word basis rather than line by line. In another embodiment, the highlighting formatting is set to present the words which the speaker has already read in a highlighted formatting so the speaker may know what words have already been read. In another embodiment, the highlighted formatting may be presented on a section by section basis. The section highlighted may be any number of words or any number of lines of the prewritten script. The highlighted formatting may be completed in any type of format, such as changing the color of the text, changing the color of the background of the text, changing the font of the text, changing the size of the font of the text, presenting the text in bold, presenting the text in italics, or presenting the text in another format that is distinctive from the format of the rest of the text of the prewritten script.

In a separate component of the invention, the method and system provide for dynamically scrolling through the prewritten script of the speaker as the speaker is reading from the prewritten script. The scrolling method dynamically adjusts based on the speaker's actual position in the text. The method provides that the text scrolls smoothly from line to line as the speaker reads from the prewritten script. The pace of the scrolling adjusts dynamically to the position of the speaker as the speaker reads from the prewritten script that is displayed on the graphical user interface. If the speaker is towards the bottom of the portion of the prewritten script displayed on the display then the system speeds up the pace of the scrolling quickens to catch up to the position of the speaker. If the speaker reads from the top of the portion of the prewritten script displayed on the display then the system slows down the pace of scrolling to allow the speaker to catch up to the prewritten script displayed in the middle portion of the display screen. This component permits the system to track and present the prewritten script in the proper manner to follow the pace of the speaker. Thus, the speaker can speak at the pace chosen by the speaker and the system will follow dynamically. Further, the speaker may change pace throughout the presentation of the speech and the system will follow the changes in pace made by the speaker.

Figure 9:
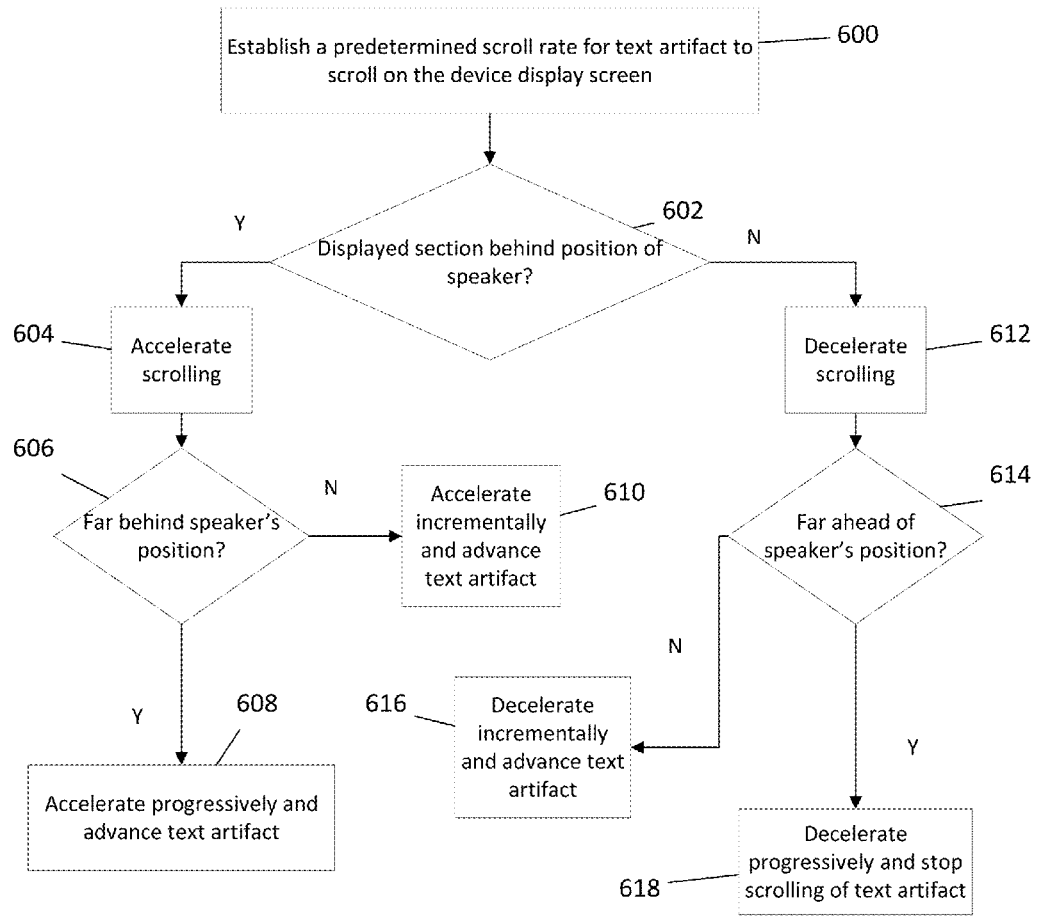
FIG. 9 is a schematic displaying the method of the invention.

The method of altering the scrolling of the text artifact is displayed in FIG. 9. First the system establishes a predetermined scroll rate for the text artifact to scroll on the device display screen 600. The system then determines the position of the speaker in the text artifact by determining the location of the text artifact where the hypothesis has been matched and its location on the screen of the computerized device. The system is configured to continuously present the location of the speaker in the text artifact within the middle section of the display screen of the computerized device. The system then determines whether the central portion of the text artifact displayed on the screen of the computerized device is behind the position of the speaker (or the location of the hypothesis match in the text artifact) 602. If the central displayed section is behind the position of the speaker then the system accelerates the scrolling 604. The system then determines whether the central displayed section is far behind the speaker's position 606. If the central displayed section is far behind the position of the speaker then the system accelerates the rate progressively and advances the text artifact 608. If the central displayed section is not far behind the position of the speaker then the system accelerates the scrolling incrementally and advances the text artifact 610. If the central displayed section is not behind the position of the speaker, but is instead ahead of the speaker's position then the system decelerates the scrolling 612. The system then determines whether the central displayed section is far ahead of the speaker's position 614. If the system determines that the central displayed section is not far ahead of the speaker's position then the system decelerates the scrolling incrementally and advances the text artifact 616. If the system determines that the central displayed section is far ahead of the speaker's position then the system decelerates progressively and stops the scrolling of the text artifact 618.

Figure 10:
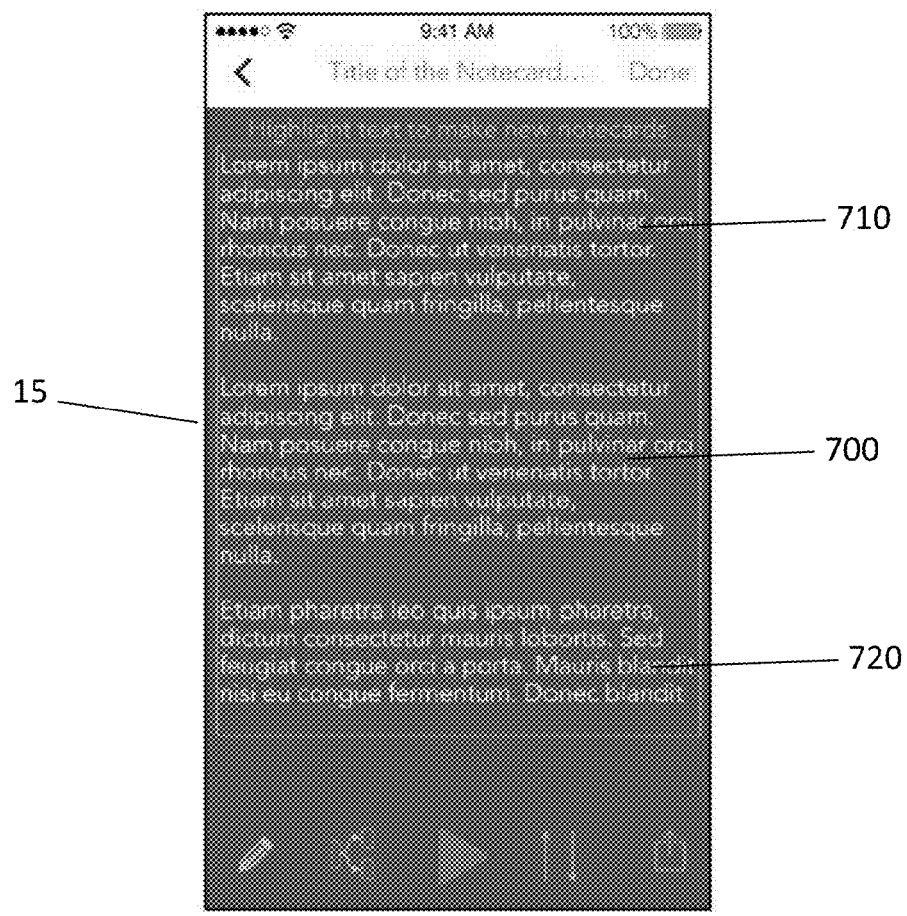
FIG. 10 is a view of a device utilizing the invention.

Referring to FIG. 10, the scrolling method of the invention is further illustrated. The display screen 15 prominently displays the central displayed section 700 in the center of the display screen 15. In the preferred embodiment the matched hypothesis is continuously located within the central display section 700. If the system determines that the matched hypothesis is located in the top display section 710 then the system automatically increases the scrolling rate of the text artifact 100 on the display screen 15. If the system determines that the matched hypothesis is located in the bottom display section 720 then the system automatically decreases or stops the scrolling rate of the text artifact 100 on the display screen 15.

In a separate component of the invention, the method and system automatically adjust the presentation of the prewritten script based on manual adjustments made by the user on the graphical display of the device. In this component, the user may touch and the graphical display of the device displaying the prewritten script. In one embodiment of this component, the user utilizes a computerized device with a touch screen display. The user can use two fingers to touch the touch screen display and pinch the screen to zoom out. The user can zoom in on the prewritten script by moving both fingers in opposite directions. When a user utilizes the zoom in and out feature the software automatically adjusts the text size of the prewritten script. In one example of an embodiment of this component, and by no means limiting the scope of this component, a user touches the touch screen display with two fingers and moves both fingers apart. This move enacts the zoom in feature. The font of the prewritten script would thus change and get larger. Alternatively, the user may touch the touch screen display with two fingers and pinch the two fingers together. This move enacts the zoom out feature. The font of the prewritten script would thus change and get smaller. The zoom feature may occur in a multitude of embodiments. For instance, when zooming out the display may show additional lines of the prewritten script that were not viewable on the display screen before zooming out. Alternatively, the display may still only show the original lines of the prewritten script without adding lines which were not viewable before zooming out. In another embodiment, the zoom feature may rearrange the number of words present on each line of the prewritten script as displayed on the display screen. In this embodiment, when a user zooms in the words which were all on one line may rearrange so that the words at the end of the line move below to the next line and start the next line of the prewritten script displayed. The words displayed on the remaining lines of the prewritten script are thus rearranged so that the total number of words displayed on each line decrease. Alternatively, in this embodiment, when a user zooms out the words which were on multiple lines rearrange so that the words on the multiple lines combine onto one line. In this manner, words which had started a second line move after the words at the end of the prior line.

Another component of the invention is a modification of the matching algorithm based on the manual zoom performed by the user. The matching algorithm starts with the creation of a scoped down hypothesis. When a user zooms in or zooms out, the first word of a line changes. The matching algorithm then automatically resets the start position from where it creates hypotheses to the new first word of the line. The matching algorithm may begin to create a new hypothesis which overlaps, fully or partially, with any old hypothesis created prior to the user zooming in or zooming out. The matching algorithm can thus reset and start tracking from the new word position automatically without requiring the user to reset the tracking position. The matching algorithm correctly calibrates based on the size of the font and specific graphical view of the script utilized by a user.

Each of these components may exist independently of the other components. Each component may be utilized separate from method utilized to track the prewritten script with speech recognition.

The methods, systems, and components above may be utilized in any fashion and for any purpose. In the preferred embodiment the methods are utilized as methods for a teleprompter. However, other natural uses for the methods may be self-evident as other embodiments without departing from the invention. For instance, and without limiting the scope of the invention, the methods, systems, and components may be utilized for a closed captioning system, a teletype device, TTY or TDD, game, or any other type of auditory device or system or software program utilizing audio.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module, which may reside on a tangible, non-transitory computer-readable storage medium. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The invention claimed is:

1. A computer-implemented method for dynamically presenting a prewritten text in a graphical user interface comprising
   a) receiving a text artifact, said text artifact containing a plurality of artifact words;
   b) storing, via a processor, said text artifact in a memory device of a computer;
   c) retrieving, via said processor, said text artifact;
   d) displaying said text artifact on the display screen of said computer;
   e) receiving a vocal input;
   f) generating, via said processor, a text file representing the words spoken in said vocal input, said text file containing a plurality of hypothesis words;
   g) comparing, via said processor, a predetermined number of said hypothesis words to a predetermined number of said artifact words;
   h) determining a match location in said text artifact where a specific number of said predetermined number of hypothesis words match a specific number of said predetermined number of artifact words;
   i) altering, via said processor, the display on said display screen to display said match location on said display screen of said computer;
   j) determining, via said processor, the font size of the text of said text artifact as displayed on said display screen;
   k) determining, via said processor, the orientation of the electronic screen displaying the text of the text artifact;
   l) altering, via said processor, said predetermined number of artifact words utilized for comparing to said predetermined number of hypothesis words.

2. The method as in claim 1 further comprising highlighting on said display of said computer screen one or more artifact words within said match location of said text artifact.

3. The method as in claim 2 wherein said method of highlighting comprises altering the font of one or more artifact words on said display screen.

4. The method as in claim 2 wherein the method of highlighting comprises altering the color of the font of one or more artifact words on said display screen.

5. The method as in claim 2 wherein the method of highlighting comprises creating a rectangular box surrounding one or more artifact words on said display screen of said computer.

6. The method as in claim 1 further comprising
   a) determining whether one or more words of said plurality of hypothesis words have been matched to a match location of said text artifact;
   b) removing one or more words from said plurality of hypothesis words, wherein said removed words have been previously matched to a match location of said text artifact.

7. The method as in claim 6 further comprising determining whether said plurality of hypothesis words number four or more.

8. The method as in claim 1 further comprising
   a) retrieving twenty words of said text artifact following said match location;
   b) comparing, via said processor, a predetermined number of said hypothesis words to said twenty words of said text artifact following said match location.

9. The method as in claim 1 further comprising establishing a scroll rate for said text artifact on said display screen of said computer.

10. The method as in claim 9 further comprising increasing said scroll rate when a speaker's location in said text artifact is positioned at a bottom portion of the display screen.

11. The method as in claim 9 further comprising decreasing said scroll rate when a speaker's location in said text artifact is positioned at a top portion of the display screen.

12. A computer-implemented method for dynamically presenting a prewritten text in a graphical user interface comprising
   a) receiving a text artifact, said text artifact containing a plurality of artifact words;
   b) storing, via a processor, said text artifact in a memory device of a computer;

c) retrieving, via said processor, said text artifact;
d) displaying said text artifact on the display screen of said computer;
e) receiving a vocal input;
f) generating, via said processor, a text file representing the words spoken in said vocal input, said text file containing a plurality of hypothesis words;
g) comparing, via said processor, a predetermined number of said hypothesis words to a predetermined number of said artifact words, wherein comparing said predetermined number of said hypothesis words to said predetermined number of said artifact words comprises
  i) creating a first group containing said predetermined number of hypothesis words;
  ii) creating a second group containing said predetermined number of artifact words, said second group being displayed on said display screen of said computer;
  iii) respectively determining whether each of said predetermined number of hypothesis words is present in said first group;
  iv) respectively determining whether each of said predetermined number of artifact words is present in said first group;
  v) generating a single number, wherein said single number is representative of the degree of similarity between said first group and said second group;
h) determining a match location in said text artifact where a specific number of said predetermined number of hypothesis words match a specific number of said predetermined number of artifact words;
i) altering, via said processor, the display on said display screen to display said match location on said display screen of said computer.

13. The method as in claim 12 further comprising highlighting on said display of said computer screen one or more artifact words within said match location of said text artifact.

14. The method as in claim 12 further comprising establishing a scroll rate for said text artifact on said display screen of said computer.

15. A computer-implemented method for dynamically presenting a prewritten text in a graphical user interface comprising
  a) receiving a text artifact, said text artifact containing a plurality of artifact words;
  b) storing, via a processor, said text artifact in a memory device of a computer;
  c) retrieving, via said processor, said text artifact;
  d) displaying said text artifact on the display screen of said computer;
  e) receiving a vocal input;
  f) generating, via said processor, a text file representing the words spoken in said vocal input, said text file containing a plurality of hypothesis words;
  g) comparing, via said processor, a predetermined number of said hypothesis words to a predetermined number of said artifact words;
  h) determining a match location in said text artifact where a specific number of said predetermined number of hypothesis words match a specific number of said predetermined number of artifact words;
  i) altering, via said processor, the display on said display screen to display said match location on said display screen of said computer;
  j) determining two or more second groups of said predetermined number of artifact words having a generated single number greater than a predetermined number;
  k) creating a list of all bigrams contained in said predetermined number of hypothesis words;
  l) creating a list of all trigrams contained in said predetermined number of hypothesis words;
  m) respectively creating a list of all bigrams contained in each of said two or more second groups;
  n) respectively creating a list of all trigrams contained in each of said two or more second groups;
  o) respectively comparing each list of bigrams of said two or more second groups to said list of all bigrams contained in said predetermined number of hypothesis words;
  p) respectively comparing each list of trigrams of said two or more second groups to said list of all trigrams contained in said predetermined number of hypothesis words;
  q) determining one of said two or more second groups of said predetermined number of artifact words having the greatest total number of bigrams and trigrams present in said list of all bigrams and said list of all trigrams contained in said predetermined number of hypothesis words;
  r) selecting said one of said two or more second groups of said predetermined number of artifact words having the greatest total number of bigrams and trigrams present in said list of all bigrams and said list of all trigrams contained in said predetermined number of hypothesis words;
  s) selecting a portion of said text artifact, wherein said selected portion of text artifact contains said selected one of said two or more second groups of said predetermined number of artifact words having the greatest total number of bigrams and trigrams present in said list of all bigrams and said list of all trigrams contained in said predetermined number of hypothesis words.

16. The method as in claim 15 further comprising highlighting on said display of said computer screen one or more artifact words within said match location of said text artifact.

17. The method as in claim 15 further comprising establishing a scroll rate for said text artifact on said display screen of said computer.

18. A computer-implemented method for dynamically presenting a prewritten text in a graphical user interface comprising, on a computer comprising a microprocessor, a visual display, and a nonvolatile memory unit, said nonvolatile memory unit storing instructions which when executed by said microprocessor cause the computer to perform operations comprising
  a) receiving a text artifact, said text artifact containing a plurality of artifact words;
  b) storing, via a processor, said text artifact in a memory device of a computer;
  c) retrieving, via said processor, said text artifact;
  d) displaying said text artifact on the display screen of said computer;
  e) receiving a vocal input;
  f) generating, via said processor, a text file representing the words spoken in said vocal input, said text file containing a plurality of hypothesis words;
  g) comparing, via said processor, a predetermined number of said hypothesis words to a predetermined number of said artifact words;
  h) determining a match location in said text artifact where a specific number of said predetermined number of hypothesis words match a specific number of said predetermined number of artifact words;

i) altering, via said processor, the display on said display screen to display said match location on said display screen of said computer;
j) determining whether one or more words of said plurality of hypothesis words have been matched to a match location of said text artifact;
k) removing one or more words from said plurality of hypothesis words, wherein said removed words have been previously matched to a match location of said text artifact;
l) determining, via said processor, the font size of the text of said text artifact as displayed on said display screen;
m) determining, via said processor, the orientation of the electronic screen displaying the text of the text artifact;
n) altering, via said processor, said predetermined number of artifact words utilized for comparing to said predetermined number of hypothesis words.

19. The method as in claim 18
a) wherein comparing said predetermined number of said hypothesis words to said predetermined number of said artifact words comprises
   i) creating a first group containing said predetermined number of hypothesis words;
   ii) creating a second group containing said predetermined number of artifact words, said second group being displayed on said display screen of said computer;
   iii) respectively determining whether each of said predetermined number of hypothesis words is present in said first group;
   iv) respectively determining whether each of said predetermined number of artifact words is present in said first group;
   v) generating a single number, wherein said single number is representative of the degree of similarity between said first group and said second group;
b) said method further comprising
   i) determining two or more second groups of said predetermined number of artifact words having a generated single number greater than a predetermined number;
   ii) creating a list of all bigrams contained in said predetermined number of hypothesis words;
   iii) creating a list of all trigrams contained in said predetermined number of hypothesis words;
   iv) respectively creating a list of all bigrams contained in each of said two or more second groups;
   v) respectively creating a list of all trigrams contained in each of said two or more second groups;
   vi) respectively comparing each list of bigrams of said two or more second groups to said list of all bigrams contained in said predetermined number of hypothesis words;
   vii) respectively comparing each list of trigrams of said two or more second groups to said list of all trigrams contained in said predetermined number of hypothesis words;
   viii) determining one of said two or more second groups of said predetermined number of artifact words having the greatest total number of bigrams and trigrams present in said list of all bigrams and said list of all trigrams contained in said predetermined number of hypothesis words;
   ix) selecting said one of said two or more second groups of said predetermined number of artifact words having the greatest total number of bigrams and trigrams present in said list of all bigrams and said list of all trigrams contained in said predetermined number of hypothesis words;
   x) selecting a portion of said text artifact, wherein said selected portion of text artifact contains said selected one of said two or more second groups of said predetermined number of artifact words having the greatest total number of bigrams and trigrams present in said list of all bigrams and said list of all trigrams contained in said predetermined number of hypothesis words.

20. The method as in claim 19 further comprising establishing a scroll rate for said text artifact on said display screen of said computer.

* * * * *